United States Patent
Tochio

(10) Patent No.: US 9,716,650 B2
(45) Date of Patent: Jul. 25, 2017

(54) COMMUNICATION SYSTEM AND TRANSFER APPARATUS

(71) Applicant: FUJITSU LIMITED, Kawasaki-shi, Kanagawa (JP)

(72) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/296,821

(22) Filed: Jun. 5, 2014

(65) Prior Publication Data

US 2015/0023149 A1    Jan. 22, 2015

(30) Foreign Application Priority Data

Jul. 19, 2013    (JP) ................................ 2013-150817

(51) Int. Cl.
*H04L 12/26* (2006.01)
*H04L 12/703* (2013.01)
(Continued)

(52) U.S. Cl.
CPC .......... *H04L 45/28* (2013.01); *H04L 41/0654* (2013.01); *H04L 41/0668* (2013.01);
(Continued)

(58) Field of Classification Search
CPC . H04L 41/0663; H04L 41/0668; H04L 45/14; H04L 45/22; H04L 45/28;
(Continued)

(56) References Cited

U.S. PATENT DOCUMENTS 8,248,913 B1 * 8/2012 Liu .................. H04L 45/22 370/216
2003/0137932 A1 * 7/2003 Nishioka ............. H04L 41/0668 370/216
(Continued)

FOREIGN PATENT DOCUMENTS

JP    2001-016240    1/2001
JP    2003-218912    7/2003
(Continued)

OTHER PUBLICATIONS

Office Action issued by the Japanese Patent Office on Feb. 7, 2017 in corresponding Japanese patent application No. 2013-150817.

*Primary Examiner* — Kwang B Yao
*Assistant Examiner* — Harun Chowdhury
(74) *Attorney, Agent, or Firm* — Staas & Halsey LLP

(57) ABSTRACT

A communication system includes a work path and a protection path that are set between a first transfer apparatus and a second transfer apparatus, one of the work path and the protection path being selected by the first transfer apparatus and the second transfer apparatus according to a control signal that includes first information indicating whether there is a failure in one of the work path and the protection path, and a third path that is activated when the first transfer apparatus or the second transfer apparatus receives a control signal in which the first information has been changed to second information indicating that a failure had occurred in both the work path and the protection path and is selected by the first transfer apparatus and the second transfer apparatus.

3 Claims, 26 Drawing Sheets

(51) Int. Cl.
    *H04L 12/24*     (2006.01)
    *H04L 29/14*     (2006.01)
    *H04L 12/721*     (2013.01)
    *H04L 12/707*     (2013.01)
    *H04L 12/723*     (2013.01)

(52) U.S. Cl.
    CPC .............. *H04L 45/14* (2013.01); *H04L 45/22* (2013.01); *H04L 69/40* (2013.01); *H04L 45/50* (2013.01)

(58) Field of Classification Search
    CPC . H04L 41/12; H04L 41/0654; H04L 41/0659; H04L 45/50; H04L 45/60; H04L 69/40
    USPC .................... 370/216, 217, 218, 221, 228
    See application file for complete search history.

(56) References Cited

U.S. PATENT DOCUMENTS

| | | | |
|---|---|---|---|
| 2005/0013241 A1* | 1/2005 | Beller | H04L 41/0663 370/216 |
| 2008/0192625 A1 | 8/2008 | Aono | |
| 2013/0071117 A1* | 3/2013 | Pan | H04J 3/12 398/45 |

FOREIGN PATENT DOCUMENTS

| | | |
|---|---|---|
| JP | 2006-049953 | 2/2006 |
| JP | 2006-340058 | 12/2006 |
| JP | 2008-004993 | 1/2008 |
| JP | 2008-199284 | 8/2008 |
| JP | 2010-239279 | 10/2010 |
| JP | 2011-171980 | 9/2011 |

\* cited by examiner

FIG. 22

| 1 | | | | | 2 | 3 | 4 |
|---|---|---|---|---|---|---|---|
| 8 | 7 | 6 | 5 | 4 3 2 1 | 8 7 6 5 4 3 2 1 | 8 7 6 5 4 3 2 1 | 8 7 6 5 4 3 2 1 |
| Request/ State | | | | Prot. Type<br>A \| B \| D \| R | Requested Signal | Bridged Signal T | Reserved |

| | |
|---|---|
| 1111 | Lockout of Protection (LO) |
| 1110 | Signal Fail for Protection (SF-P) |
| 1101 | Forced Switch (FS) |
| 1011 | Signal Fail for Working (SF) |
| 1001 | Signal Degrade (SD) |
| 0111 | Manual Switch (MS) |
| 0110 | Deprecated |
| 0101 | Wait to Restore (WTR) |
| 0100 | Exercise (EXER) |
| 0010 | Reverse Request (RR) |
| 0001 | Do Not Revert (DNR) |
| 0000 | No Request (NR) |

COMMUNICATION SYSTEM AND TRANSFER APPARATUS

CROSS-REFERENCE TO RELATED APPLICATION

This application is based upon and claims the benefit of priority of the prior Japanese Patent Application No. 2013-150817 filed on Jul. 19, 2013, the entire contents of which are incorporated herein by reference.

FIELD

The embodiment discussed herein is related to a communication system and a transfer apparatus.

BACKGROUND

Redundancy of liens (paths) is an important technology to relieve communication lines (traffic) from failures in transmission lines and transfer apparatuses (which may include relay apparatuses). Redundancy technologies called linear protection and ring protection have been proposed or developed. These technologies, which are designed against failures in part of transmission lines or some transfer apparatuses, take a redundancy form called 1+1, 1:1, or the like.

Conventional redundancy technologies described in Japanese Laid-open Patent Publication Nos. 2006-49953, 2001-16240, 2011-171980, 2008-199284, and 2008-4993 are known.

In the technology in Japanese Laid-open Patent Publication No. 2006-49953, if a failure is detected in both an active (work) path and a standby (protection) path, which are hardware lines, a restoration path based on a software line is searched for and is set according to the search result, the restoration line being used in case of a failure.

In the technology in Japanese Laid-open Patent Publication No. 2001-16240, each two adjacent optical node apparatuses are mutually connected through first to third optical transfer paths; three rings formed with the first to third optical transfer paths are used to relieve a failed line.

In the technology in Japanese Laid-open Patent Publication No. 2011-171980, assuming a failure pattern in which a link of a first or second path is disconnected, a path controller calculates a third path with reference topology information.

In the technology in Japanese Laid-open Patent Publication No. 2008-199284, to allow for a failure in any one of two paths, another path is provided that can switch to a path in which a failure has not occurred without any interruption; the path free from a failure and the other path form a redundant architecture again without any interruption.

In the technology in Japanese Laid-open Patent Publication No. 2008-4993, to make a match between the protection modes of opposing apparatuses, a code that requests a mode to be changed is newly defined in an automatic protection switching (APS) byte; the APS byte that includes the code is transmitted to the distant apparatus.

However, the technologies described in Japanese Laid-open Patent Publication Nos. 2006-49953, 2001-16240, 2011-171980, 2008-199284, and 2008-4993 are susceptible to improvement in that how another path is activated quickly under simple control if a failure occurs in both the active path and the standby path and how a switchover to the other path is made.

SUMMARY

According to an aspect of the embodiments, a communication system includes a work path and a protection path that are set between a first transfer apparatus and a second transfer apparatus, one of the work path and the protection path being selected by the first transfer apparatus and the second transfer apparatus according to a control signal that includes first information indicating whether there is a failure in one of the work path and the protection path, and a third path that is activated when the first transfer apparatus or the second transfer apparatus receives a control signal in which the first information has been changed to second information indicating that a failure had occurred in both the work path and the protection path and is selected by the first transfer apparatus and the second transfer apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 illustrates the format of the APS message stipulated in ITU-T Recommendation G.8031;

DESCRIPTION OF EMBODIMENT

Figure 1:
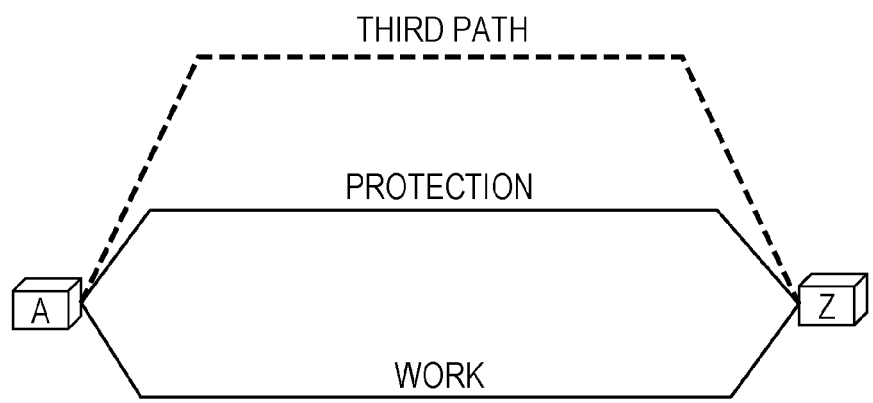
FIG. 1 illustrates an example of a 1+1 or 1:1 redundant path architecture.

An embodiment of the present disclosure will be described with reference to the drawings. The embodiment described below is only illustrative; there is no intention to exclude application of various variations and technologies that are not clearly described below. In the drawings referenced in the embodiment described below, unless otherwise noted, elements denoted by the same numerals are the same elements or similar elements.

FIG. 1 illustrates an example of a 1+1 or 1:1 redundant path architecture in which a work (W) path and a protection (P) path are included as transfer paths. This architecture may be referred to as the linear protection. In the example in FIG. 1, the W path and P path are set between two transfer apparatuses A and Z (referred to below as the nodes A and B).

Recently, there is a demand for a new redundant path, which is a so-called a third path, the path being added to a 1+1 or 1:1 redundant architecture, to allow for large-scale (global) failures caused by an earthquake or another disaster. That is, if a failure occurs in both the W path and the P path, for example, communication (traffic) is preferably relieved by another path, which may be referred to below as the third path, as illustrated by the broken lines in FIG. 1.

However, as for the third path for the linear protection path, an architecture that provides n:1 redundancy (n is an integer greater than or equal to 2 that indicates the number of protection paths) or APS processing has not yet been studied in, for example, the ITU-T recommendations (G808.1, G.8031, etc.) or other standards. One reason for this is that a technical problem of defining a plurality of pieces of APS processing for each of a plurality of P paths provided for one W path has not been solved. To achieve an n:1 redundant architecture, for example, a plurality of pieces of APS processing is preferably combined and priority processing on these pieces of APS processing is also preferably considered.

Figure 2:
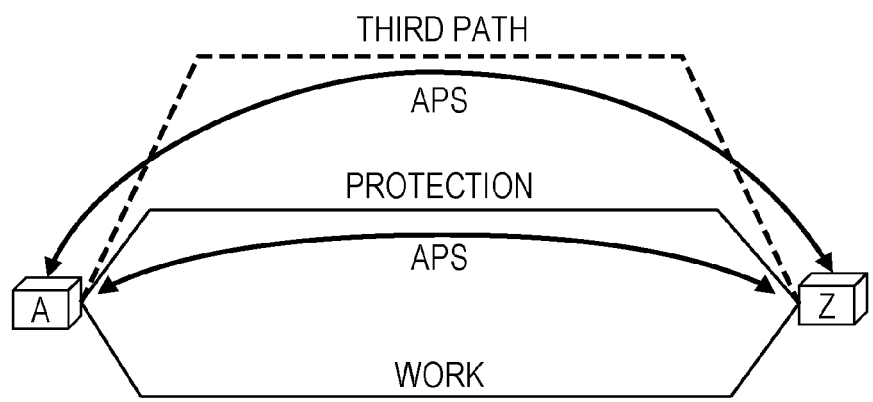
FIG. 2 schematically illustrates a transfer of an APS message to a plurality of protection paths.

Accordingly, as schematically illustrated in FIG. 2, even if an APS message flowing through a representative P path among a plurality of P paths is mirrored (reproduced) and the mirrored APS messages are simply caused to flow in the plurality of P paths, switching may not be normally carried out (a malfunction may occur) due to, for example, an inconsistency in the APS processing between the node A and the node Z.

Figure 3:
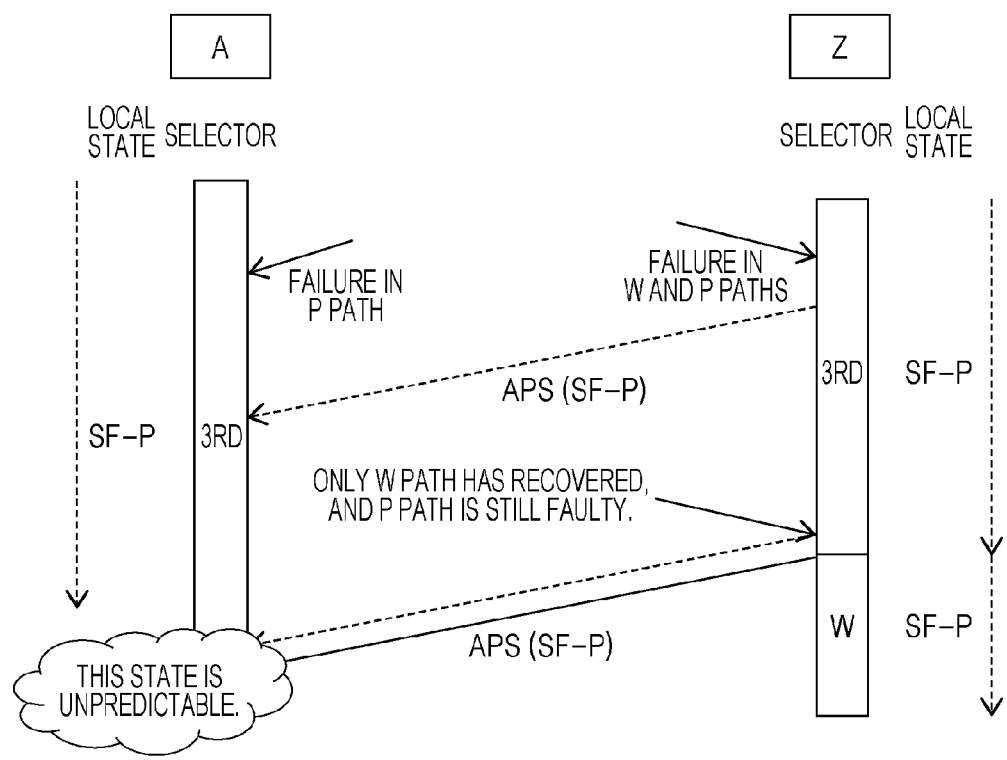
FIG. 3 illustrates a case in which a path switchover is not normally carried out in the example in FIG. 2.

FIG. 3 illustrates an example. In FIG. 3, LOCAL STATE indicates an apparatus state related to the APS message at the node A or Z and SELECTOR indicates a path selected by the node A or Z, 3RD indicating that a third path has been selected and W indicating that the W path has been selected.

As illustrated in FIG. 3, it is assumed that a failure has been detected in the P by the node A and a failure has been detected in the W path and P path by the node Z. Then, the node Z transfers (signals) an APS (SF-P: Signal Fail for Protection) message, which indicates a failure in the P path, to both the P path and the third path. The broken arrows in FIG. 3 each indicate the flow of an APS message transmitted to the third path.

The opposing node A receives the APS (SF-P) message through the third path. Since the third path has been already selected due to a failure detected in the P path, however, the node A does not take any particular action (no action occurs). Even if, after that, the node Z detects that the W path has been recovered, the failure is still left in the P path, so the node Z signals an APS (SF-P) message to both the P path and the third path. The node Z selects the recovered W path.

The opposing node A receives the APS (SF-P) message through the third path. In this case as well, the third path has been already selected due to a failure detected in the P path, the node A does not take any particular action (the node A performs an undefined operation). Therefore, the node A continues to select the third path in spite of the opposing node Z having selected the W path, normal switching (switching back to the W path) may not be performed.

In other words, when a plurality of 1:1 or 1+1 architectures are provided, a switching management apparatus is used individually for each architecture. Then, switching control becomes complex, suppressing a switching time from being shortened.

It is known that, on a GMPLS network, a solution to an n:1 redundant architecture is to provide a third path by expanding a protection object defined in RFC 4872. That is, an idea is introduced that GMPLS signaling is provided to both a W path (W-LSP: working label switched path) and a P path (P-LSP: protection LSP) to provide a restoration path R (restore LSP) to a 1+1 or 1:1 redundant architecture (see FIG. 4).

Figure 4:
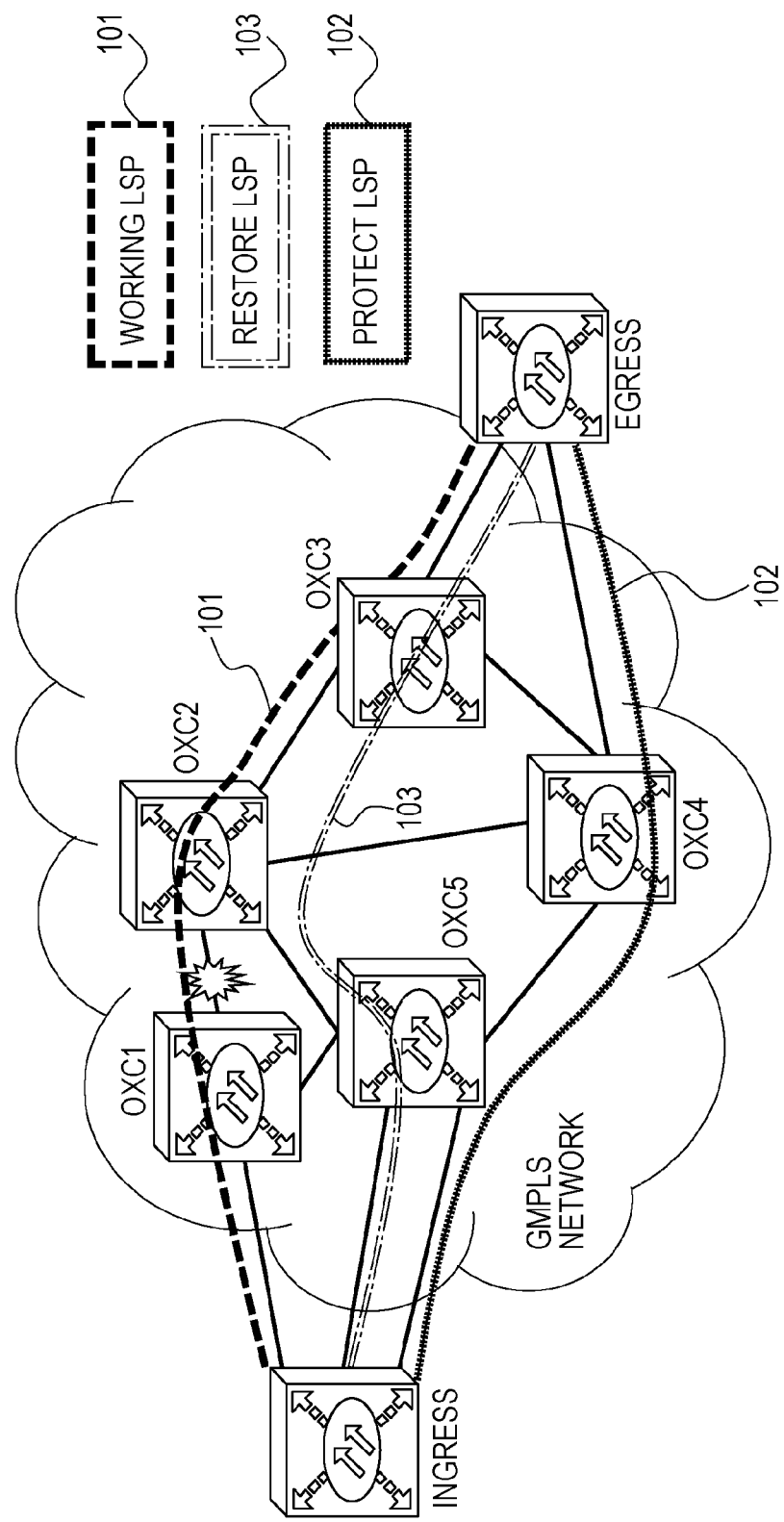
FIG. 4 illustrates an example of a solution to an n:1 redundant architecture on a generalized multi-protocol label switching (GMPLS) network.

The network illustrated in FIG. 4 includes an ingress node, an egress node, and a plurality of optical cross-connect nodes (OXC1 to OXC5) (although five nodes are illustrated, this is only an example). In FIG. 4, three LSPs, W-LSP 101, P-LSP 102 and R-LSP 103, are also included. The W-LSP 101 is a path that passes through the ingress node, optical cross-connect nodes OXC1, OXC2 and OXC3, and egress node in that order. The P-LSP 102 is a path that passes through the ingress node, optical cross-connect nodes OXC5 and OXC4, and egress node in that order. The R-LSP 103 is a path that passes through the ingress node, optical cross-connect nodes OXC5 and OXC3, and egress node in that order.

The R-LSP 103, which is equivalent to a third path, is provided by GMPLS signaling in a case in which a failure occurs in one of the W-LSP 101 and P-LSP 102 (in other words, after the occurrence of a failure). That is, a third path can be provided only when at least one of the W-LSP 101 and P-LSP 102 is normal. Accordingly, if a failure occurs in both the W-LSP 101 and the P-LSP 102, a third path may not be provided. Furthermore, there may be a case in which, for example, the R-LSP 103 is provided due to a failure in the W-LSP 101 and the W-LSP 101 is recovered after the occurrence of a failure in the P-LSP 102. In this case, however, a switchover from the R-LSP 103 back to the W-LSP 101 is not possible. This is because, in GMPLS as well, to provide a third path, it is desirable to provide a plurality of 1:1 (or 1+1) architectures, that is, it is desirable to use a plurality of switching management units.

Therefore, there is a demand for an architecture that can provide a third path to a path of a 1+1 (or 1:1) architecture even if a failure occurs in both paths and can shorten a switching time without using a plurality of switching management units (by using only a single switching management unit).

In view of the above situation, in this embodiment, an architecture is provided that provides (activates) a third path only when a failure occurs in both paths (W path and P path) in a 1+1 (or 1:1) architecture and manages switching control between the third path and the W path or P path with a single switching management unit.

Figure 5:
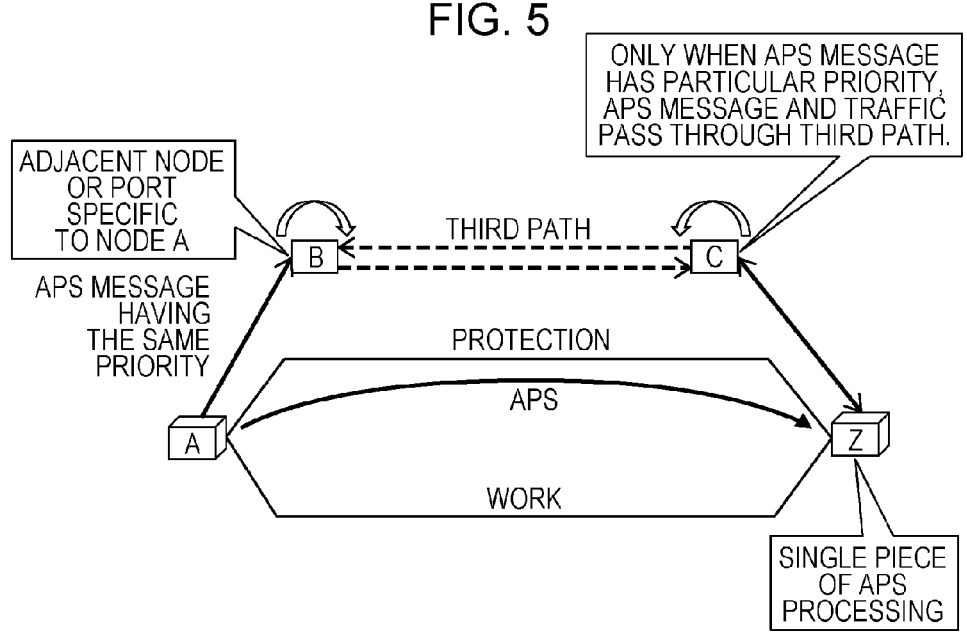
FIG. 5 conceptually illustrates the provision of a redundant path in an embodiment.

Specifically, a particular state or priority indicating that there is a failure in both the W path and the P path is newly defined for an existing APS message flowing in the W path or P path. If a failure occurs in both the W path and the P path, the APS message flows in the third path. Only when a received APS message has the particular state or priority, a node (or an interface card or port) on the third path permits the APS message and traffic to be forwarded. The APS message is an example of a control signal, and the traffic is an example of a main signal (client signal). Thus, a mechanism (architecture) by which, only when a particular state or priority is indicated, a third path is activated and an APS message and traffic pass through the third path can be implemented by using a single piece of APS processing. FIG. 5 conceptually illustrates an example of the architecture.

In FIG. 5, a W path and a P path are set between the node A and the node Z, and a path passing through the node A, a node B, a node C, and the node Z in that order is set as a third path. The nodes A and Z are respectively an example of a first transfer apparatus and an example of a second transfer apparatus. The nodes B and C are each an example of a third transfer apparatus through which the third path passes. The node B adjacent to the node A (or node C adjacent to the node Z) may be an interface card or port included in the node A (or node Z).

In the example in FIG. 5, the node A (or node Z) signals an APS message to the P path and also signals that APS message to the adjacent node B (or node C). However, the node B (or node C) activates the third path only when the APS message received from the adjacent node A (or node Z) has a particular state or priority.

If a failure occurs in both the W path and the P path, the node A (or node Z) changes the priority or state of the APS message to a particular priority or state (the priority or state will be simply represented as the priority). Thus, the APS message having the particular priority is received at the node B (or node C), enabling the third path to be activated, starting from the node B (or node C).

Examples of the priorities of the APS message include Signal Fail for Protection (SF-P) indicating that there is a failure in the P path, Signal Fail for Working (SF) indicating that there is a failure in the W path, Wait to Restore (WTR) indicating that a state waiting for restoration, and No Request (NR) indicating that there is no request, as described later with reference to FIG. 22. These priorities (information) can be positioned as an example of first information that indicates whether there is a failure in one of the W path and P path. In contrast, Signal Fail for Restoration (SF-R), which is a priority newly defined in this embodiment as described later, can be positioned as an example of second information in relation to the above first information. SF-R is a provisional name for information that indicates that there are failures in both the W path and the P path.

Figure 6:
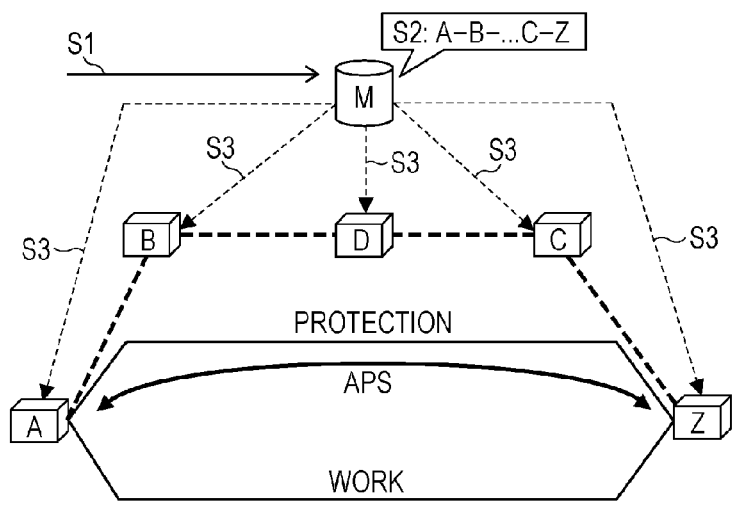
FIG. 6 illustrates an example of a setting procedure by which the redundant path in FIG. 5 can be provided.
Figure 7:
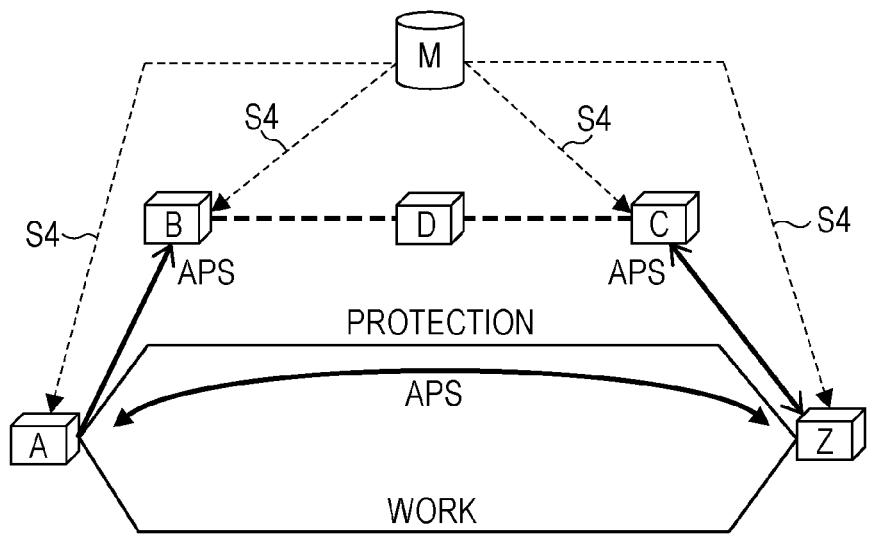
FIG. 7 illustrates an example of the setting procedure by which the redundant path in FIG. 5 can be provided.

FIGS. 6 and 7 conceptually illustrate a setting procedure to implement the architecture illustrated in FIG. 5. As an example, a case will be considered in which a third path is set in addition to a path for which protection in an existing 1+1 or 1:1 architecture is provided by APS and a network that includes the path.

Specifically, a case in which a path passing through the node B, node D, and node C in that order is set as a third path between the node A and the node Z, between which a W path and a P path have been set, as illustrated in FIGS. 6 and 7. The node B may be a node different from the adjacent node A or may be an interface card or port included in the node A as described above. Similarly, the node C may be a node different from the adjacent node Z or may be an interface card or port included in the node Z. For convenience, the nodes B and C will be described below as nodes different from the nodes A and Z, respectively. Although, in FIGS. 6 and 7, only one node D, which is an intermediate node on the third path, is illustrated, two or more nodes D may be present or no node D may be present. The W path, P path, and third path are all assumed to be bidirectionally operable by being switched.

As illustrated in FIG. 6, the management apparatus M is first activated in response to a redundancy request (request for the third path) based on a user command (the request may be a request from the node A or Z) (S1). The management apparatus M is implemented by, for example, a so-called network management system (NMS) or path computation element (PCE).

The management apparatus M calculates a path that does not cross any existing path between the node A and the node Z but passes through the nodes B and C from, for example, topology information (path search: S2). The management apparatus M sets the third path for the nodes A, B, D, C, and Z through which the third path passes, according to the search result (S3).

The management apparatus M then makes a setting to cause the node A to transmit an APS message to the adjacent node B and to cause the node Z to transmit an APS message to the adjacent node C and also makes a setting to cause the nodes B and C to terminate the received APS message (S4), as illustrated in FIG. 7. In other words, the management apparatus M sets a segment of APS message transmission between the node A and the node B and between node Z and the node C. The APS message transmitted by the node A to the adjacent node B and the APS message transmitted by the node Z to the adjacent node C are the same as the APS message transmitted to the P path. If a failure does not occur in both the W path and the P path, however, the APS message transmitted from the node A is terminated at the node B without reaching the opposing node Z and the APS message transmitted from the node Z is terminated at the node C without reaching the opposing node A.

According to the above settings, the node A (or node Z) performs APS processing, which will be described later with reference to FIGS. 20 to 22, and the node B (or node C) performs APS extraction (filtering) processing and forwarding processing, which will be described later with reference to FIG. 23.

Next, an example of path switching control performed by the management apparatus M described above after the path settings will be described with reference FIGS. 8 to 19.

Figure 8:
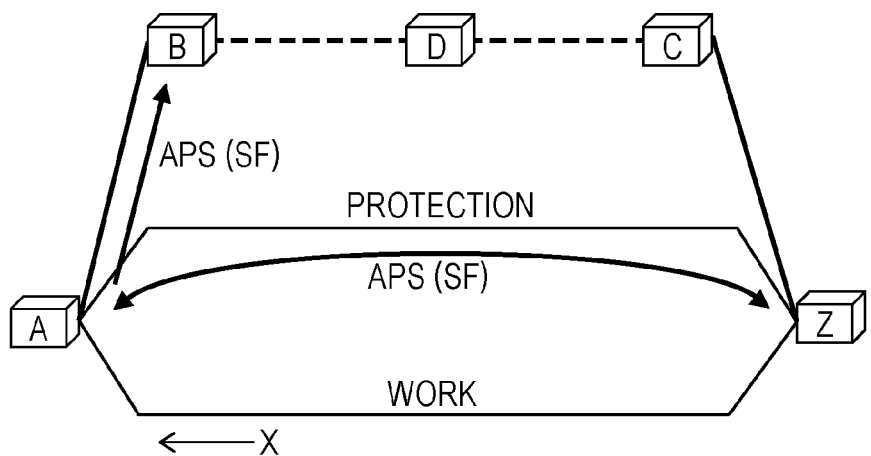
FIG. 8 illustrates an example of a switchover operation performed in a case in which a failure occurs in a work (W) path in the configurations in FIGS. 5 to 7.

It is assumed that out of the W path and P path, the W path in the direction from the node Z toward the node A has caused a failure as illustrated in FIG. 8. The failure in the W path is detected by the node A. The node A then changes the priority of the APS message from NR to SF in the APS processing and transmits the resulting APS (SF) message to the P path and the adjacent node B. The node A also makes a switchover from the W path to the P path.

The opposing node Z receives the APS (SF) message through the P path and makes a switchover from the W path to the P path. The node Z also transmits the APS (SF) message to the adjacent node C. The nodes B and C receive the APS (SF) message; however, they only terminate the received APS (SF) message and do not take any particular action.

If, out of the W path and P path, the P path causes a failure, the node A (or node Z) changes the priority of the APS message from NR to SF-P in the APS processing and transmits the resulting APS (SF-P) message to a normal path of the bidirectional P path and to the adjacent node B (or node C). In this case, although the nodes A and Z receive the APS (SF-P) message, they continue to select the W path. The nodes B and C only terminate the received ASP (SF-P) message and do not take any particular action.

Figure 9:
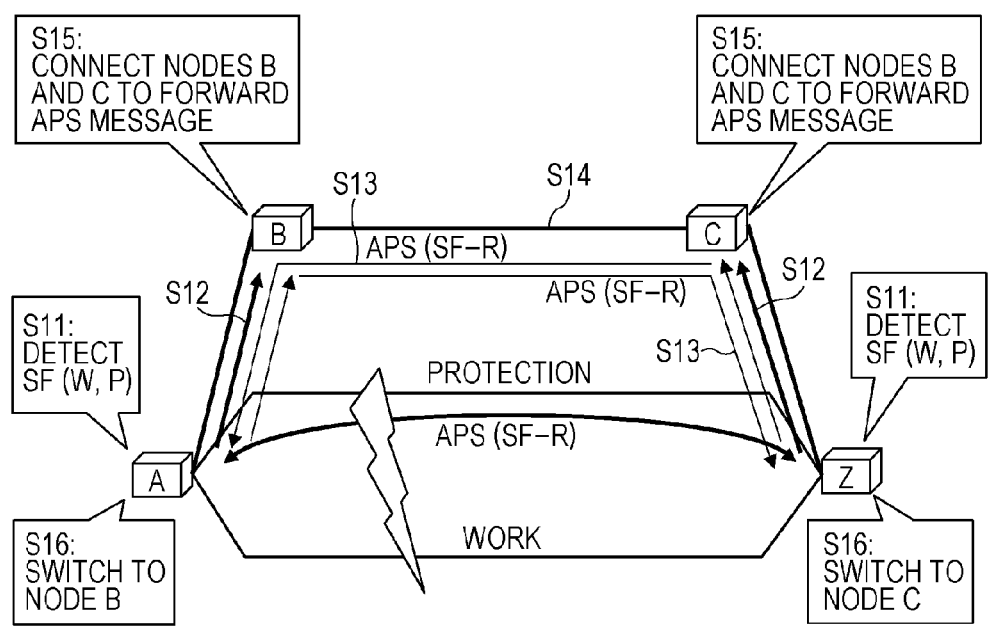
FIG. 9 illustrates an example of a switchover operation performed in a case in which a failure occurs in both the W path and a protection (P) path in the configurations in FIGS. 5 to 7.

If a failure occurs in both the W path and the P path as illustrated in FIG. 9, the third path passing through the nodes A, B, C, and Z in that order is provided (activated) between the node A and the node Z and APS messages are exchanged through the third path. A procedure for this processing will be described below.

First, if the node A, the node Z, or both detect that a failure has occurred in both the W path and the P path (S11), they change the priority of the APS message to, for example, Signal Fail for Restoration (SF-R) in the APS processing and transmit the resulting APS (SF-R) message to the P path and to the node B, the node C, or both (S12, S13). The node A or Z receives, through the P path, the APS (SF-R) message transmitted from the opposing node Z or A and performs an operation to select the third path.

When the node B (or node C) receives the APS (SF-R) message, it activates the path set between the node B and the node C and connects a path between the node B and the node A (or between the node C and the node Z) (S14). The above path activation can be implemented by a message exchange in a data layer.

Furthermore, the node B (or node C) makes its own setting, that is, local setting (forward setting), so that the APS message, which has been terminated at the node B (or node C), is forwarded (passes through the node B (or node C)) to the opposing node (from the node B through the node C to the node Z or from the node C through the node B to the node A) (S15).

When the node A receives the APS (SF-R) message, the node A switches to the path passing through the node B; when the node Z receives the APS (SF-R) message, the node Z switches to the path passing through the node C (S16). After that, the nodes A and Z exchange APS messages through the third path.

In case of failures in both the W path and the P path, the priority of the APS message is changed to a particular priority (SF-R) as described above, enabling activation of the third path and a switchover to the third path.

If at least one of the W path and P path that have failed is recovered from the failure, the APS message exchange through the third path is stopped at a time when it is confirmed that failure detection in the local processing has been canceled, and the third path is disabled. After that, the operation returns to communication through the W path, the P path, or both.

Figure 10:
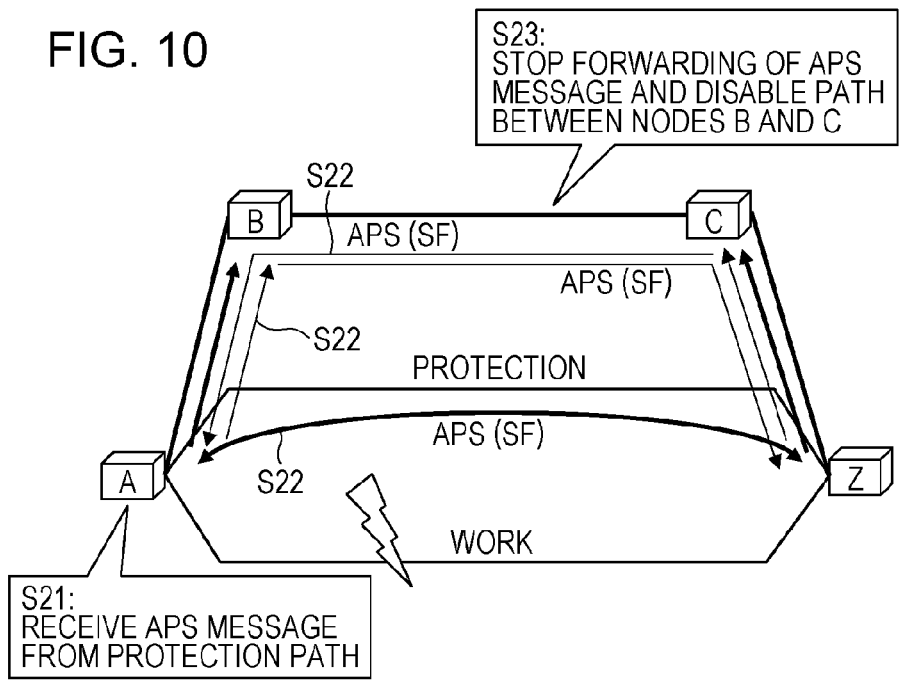
FIG. 10 illustrates an example of a switchover operation performed in a case in which a failure occurs in both the W path and the P path in the configurations in FIGS. 5 to 7 and the P path is then recovered.

If, out of the W path and P path, only the P path recovers from the failure as illustrated in FIG. 10, for example, the nodes A and Z change the path through which they receive an APS message from the third path to the P path (S21). Since, at this time, the node A, the node Z, or both have detected a failure in the W path in the local processing, they change the priority of the APS message from SF-R to SF and transmit the resulting APS (SF) message to the P path and the relevant adjacent node B or C (S22).

If the nodes B and C receive the APS (SF) message that has no particular priority, they stop forwarding of the received APS message through the path between the node B and the node C and disable the path between the node B and the node C (S23). APS message forwarding may be permitted at least once before the path is disabled.

Figure 11:
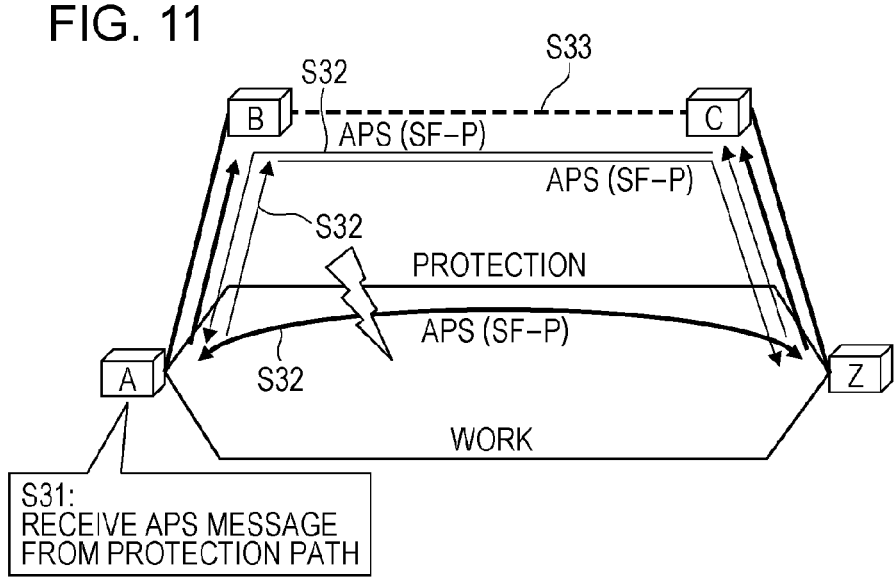
FIG. 11 illustrates an example of a switchover operation performed in a case in which a failure occurs in both the W path and the P path in the configurations in FIGS. 5 to 7 and the W path (or both the W path and the P path) is then recovered.

If, out of the W path and P path, only the W path (or both the W path and the P path) has recovered from the failure as illustrated in FIG. 11, for example, the nodes A and Z change the path through which they receive an APS message from the third path to the P path (S31). At this time, the node A, the node Z, or both have detected a failure in the P path in the local processing (or have detected a failure neither in the W path nor in the P path). Accordingly, the node A, the node Z, or both change the priority of the APS message from SF-R to SF-P (or NR) and transmit the resulting APS (SF-P) message (or APS (NR) message) to the P path and the relevant adjacent node B or C (S32).

If the nodes B and C receive the APS (SF-P) message (or APS (NR) message) that has no particular priority, they stop the forwarding of the received APS message through the path between the node B and the node C and disable the path between the node B and the node C (S33). APS message forwarding may be permitted at least once before the path is disabled.

FIGS. 12 to 19 illustrate the above operation examples with sequence diagrams. FIGS. 12 to 15 complement the operations, illustrated in FIGS. 8 and 9, that are performed at the occurrence of a failure. FIGS. 16 to 19 complement the operations, illustrated in FIGS. 10 and 11, that are performed after recovery from a failure. In FIGS. 12 to 19, APPARATUS STATE indicates the priority of APS processing at the node A or Z and SELECTOR indicates a path selected in local processing at the node A or Z. Specifically, SELECTOR selects any one of the W path, P path, and third path in local processing. In FIGS. 12 to 19, the solid arrows each indicate the flow of an APS message signaled through the P path and the broken arrows each indicate the flow of an APS message signaled through the third path.

Figure 12:
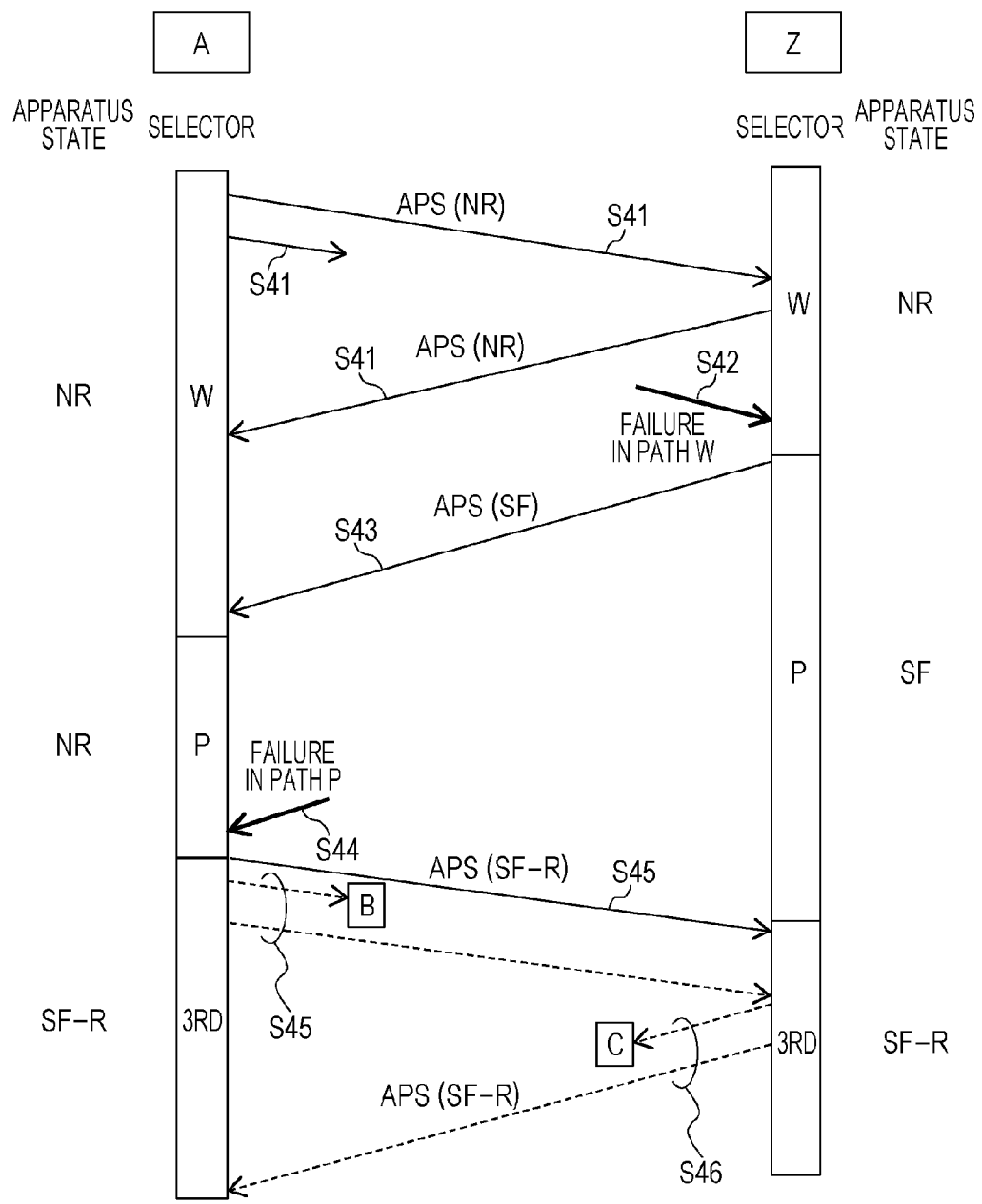
FIG. 12 complements the switchover operation illustrated in FIGS. 8 and 9 with a sequence diagram illustrating a switchover operation performed in a case in which a failure occurs in the W path on the same side as a node Z and a failure then occurs in the P path on the same side as a node A.

FIG. 12 illustrates an example of a switching sequence in a case in which the node Z detects a failure in the W path and the node A then detects a failure in the P path. As illustrated in FIG. 12, if the nodes A and Z detect a failure neither in the W path nor in the P path, they select the W path and exchange APS (NR) messages through the W path (S41).

If the node Z, for example, detects a failure in the W path (S42), the node Z selects the P path, changes the priority of the APS message from NR to SF, and then transmits the resulting APS (SF) message through the P path to the opposing node A (S43).

Upon reception of the APS (SF) message through the P path, the node A selects the P path. If the node A then detects a failure in the P path in the direction from the node Z toward the node A (S44), the node A changes the priority of the APS message from SF to SF-R, and then transmits the resulting APS (SF-R) message to the P path and node B (S45). The node A also selects the third path.

Upon reception of the APS (SF-R) message, the node Z transmits the APS (SF-R) message to the node C (S46) and selects the third path. The APS (SF-R) message destined for the node Z arrives there through one or both of the third path and the P path in the direction from the node A toward the node Z (the P path is free from a failure).

Upon reception of the APS (SF-R) message, the nodes B and C activate the path between the node B and the node C and permit APS message forwarding through the path. Thus, the third path is used for subsequent APS message exchanges between the node A and the node Z.

Figure 13:
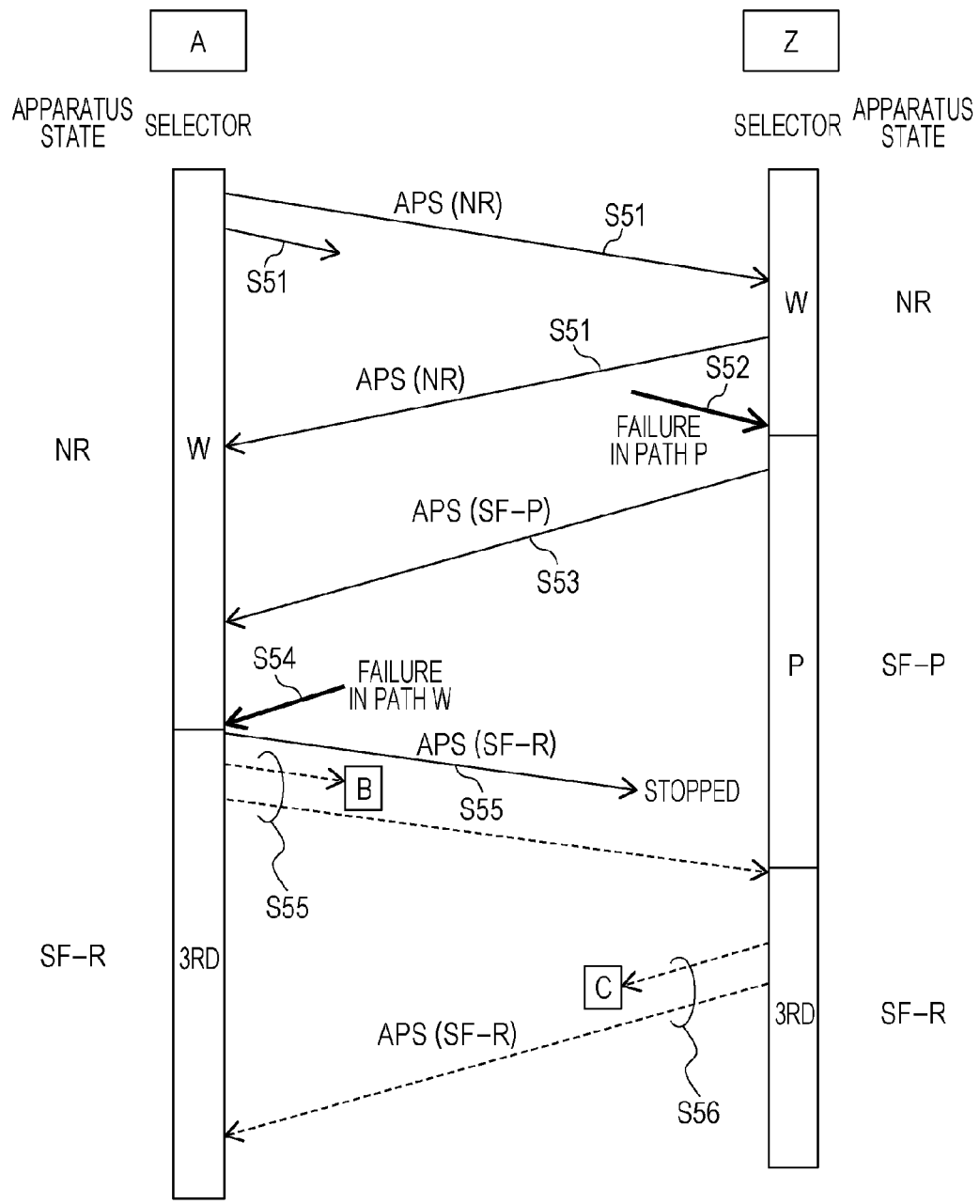
FIG. 13 also complements the switchover operation illustrated in FIGS. 8 and 9 with a sequence diagram illustrating a switchover operation performed in a case in which a failure occurs in the P path on the same side as the node Z and a failure then occurs in the W path on the same side as the node A.

FIG. 13 illustrates an example of a switching sequence in a case in which the node Z detects a failure in the P path and the node A then detects a failure in the W path. As illustrated in FIG. 13, if the nodes A and Z detect a failure neither in the W path nor in the P path, they select the W path and exchange APS (NR) messages through the W path (S51). If the node Z, for example, detects a failure in the P path in the direction from the node A toward the node Z (S52), the node Z continues to select the W path, changes the priority of the APS message from NR to SF-P. The node Z then transmits the APS (SF-P) message with the new priority to the opposing node A through the P path in the direction from the node Z toward the node A (S53).

The node A receives the APS (SF-P) message through the P path. Since the node A is selecting the W path, however, the node A does not take any particular action. If the node A detects a failure in the W path in the direction from the node Z toward the node A (S54), the node A changes the priority of the APS message from NF to SF-R and then transmits the resulting APS (SF-R) message to the P path and node B (S55). The node A also selects the third path.

Upon reception of the APS (SF-R) message, the node Z transmits the APS (SF-R) message to the node C (S56) and selects the third path. The APS (SF-R) message destined for the node Z arrives there through the third path.

Upon reception of the APS (SF-R) message, the nodes B and C activate the path between the node B and the node C and permit APS message forwarding through the path. Thus, the third path is used for subsequent APS message exchanges between the node A and the node Z.

Figure 14:
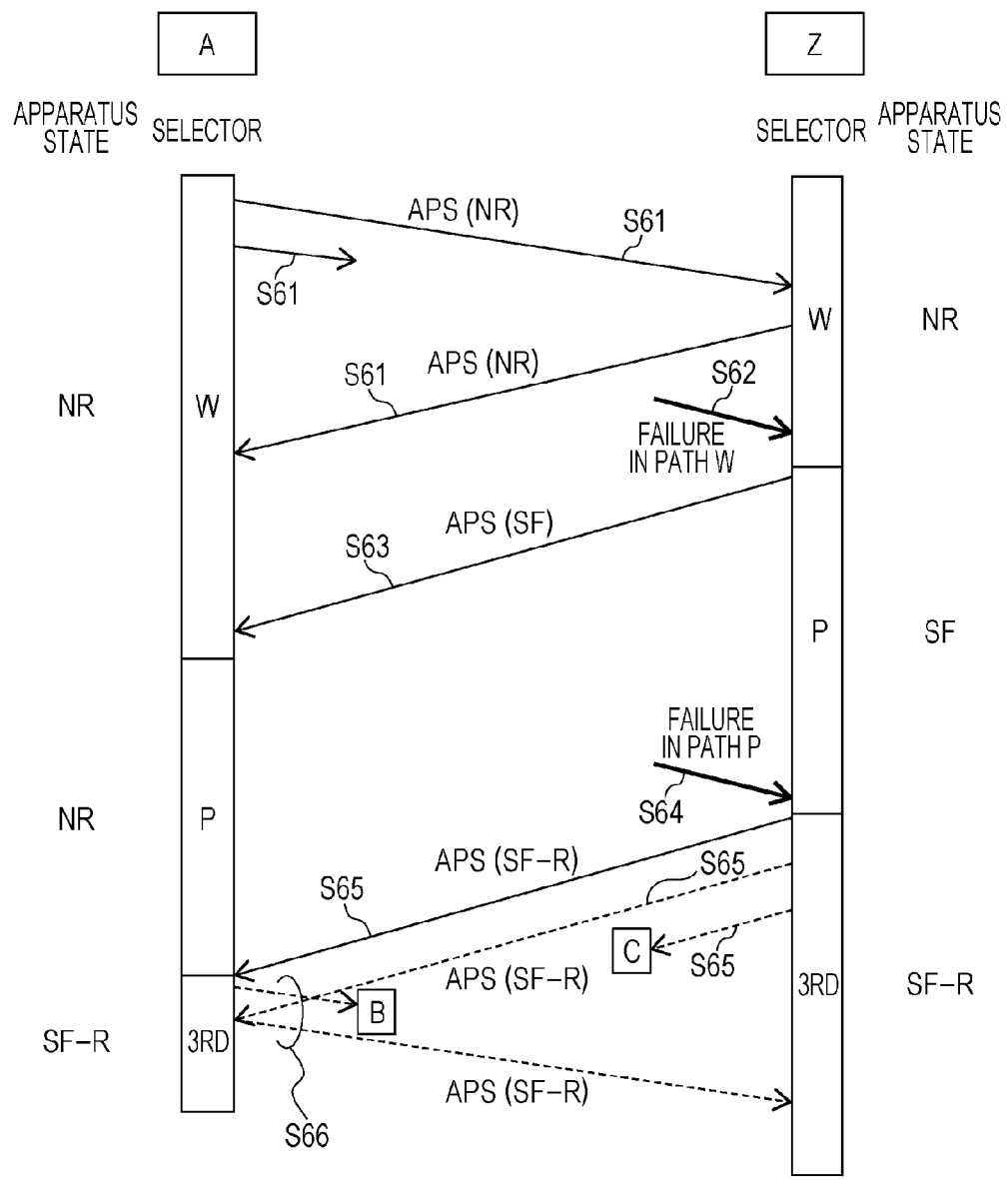
FIG. 14 also complements the switchover operation illustrated in FIGS. 8 and 9 with a sequence diagram illustrating a switchover operation performed in a case in which a failure occurs in the W path on the same side as the node Z and a failure then occurs in the P path on the same side as the node Z.

FIG. 14 illustrates an example of a switching sequence in a case in which the node Z detects a failure in the W path and the node Z then detects a failure in the P path. As illustrated in FIG. 14, if the nodes A and Z detect a failure neither in the W path nor in the P path, they select the W path and exchange APS (NR) messages through the W path (S61).

If the node Z, for example, detects a failure in the W path (S62), the node Z selects the P path, changes the priority of the APS message from NR to SF, and then transmits the resulting APS (SF) message through the P path to the opposing node A (S63).

Upon reception of the APS (SF) message through the P path, the node A selects the P path. If the node Z then detects a failure in the P path in the direction from the node A toward the node Z (S64), the node Z changes the priority of the APS message from SF to SF-R, and then transmits the resulting APS (SF-R) message to the P path in the direction toward the node A and to the node C (S65). The node Z also selects the third path.

Upon reception of the APS (SF-R) message, the node A transmits the APS (SF-R) message to the node B (S66) and selects the third path. The APS (SF-R) message destined for the node A arrives there through one or both of the third path and the P path in the direction from the node Z toward the node A.

Upon reception of the APS (SF-R) message, the nodes B and C activate the path between the node B and the node C and permit APS message forwarding through the path. Thus, the third path is used for subsequent APS message exchanges between the node A and the node Z.

Figure 15:
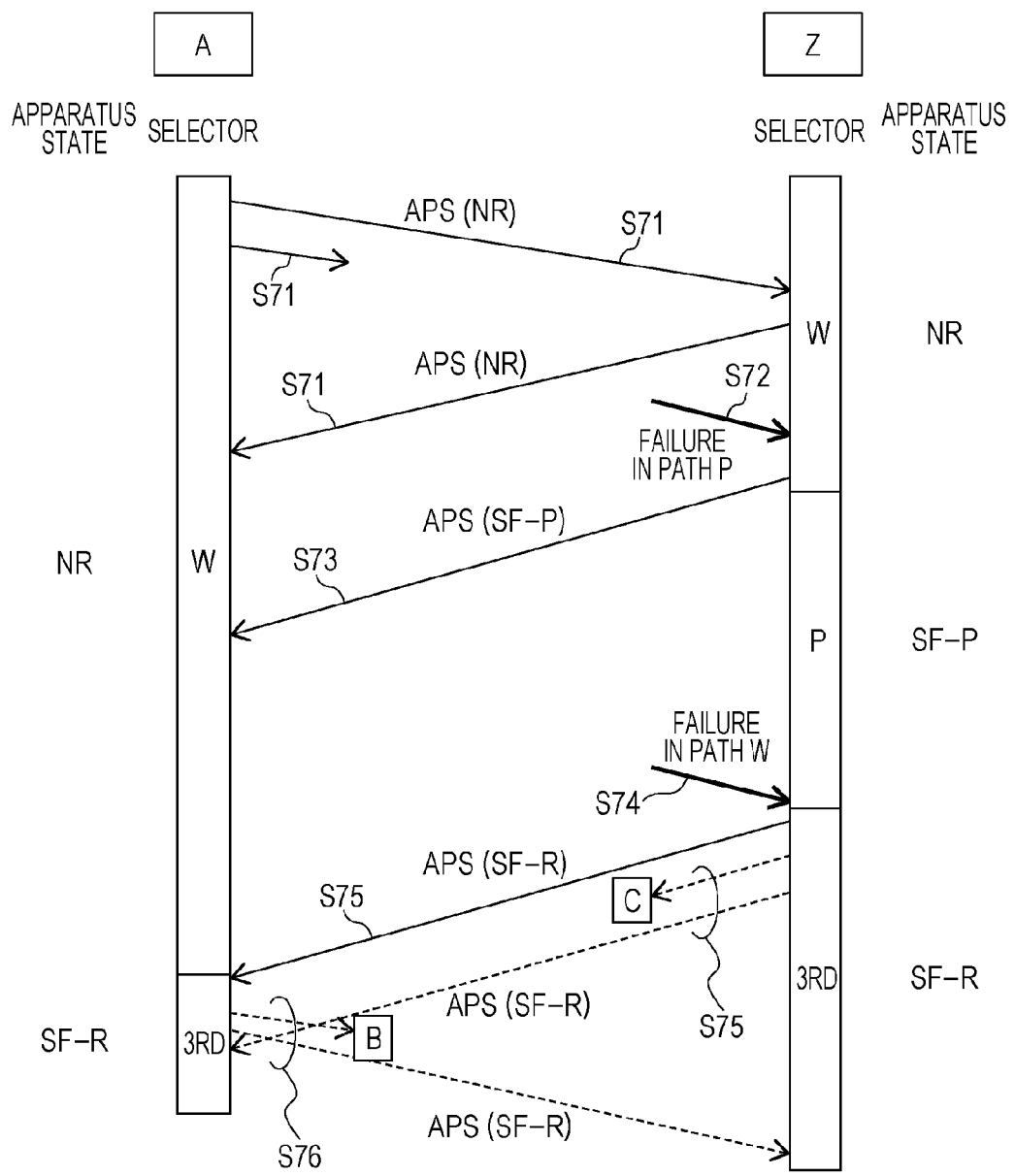
FIG. 15 also complements the switchover operation illustrated in FIGS. 8 and 9 with a sequence diagram illustrating a switchover operation performed in a case in which a failure occurs in the P path on the same side as the node Z and a failure then occurs in the W path on the same side as the node Z.

FIG. 15 illustrates an example of a switching sequence in a case in which the node Z detects a failure in the P path and the node Z then detects a failure in the W path. As illustrated in FIG. 15, if the nodes A and Z detect a failure neither in the W path nor in the P path, they select the W path and exchange APS (NR) messages through the W path (S71).

If the node Z, for example, detects a failure in the P path in the direction from the node A toward the node Z (S72), the node Z continues to select the W path, changes the priority of the APS message from NR to SF-P. The node Z then transmits the resulting APS (SF-P) message to the opposing node A through the P path in the direction from the node Z toward the node A (S73).

The node A receives the APS (SF-P) message through the P path. Since the node A is selecting the W path, however, the node A does not take any particular action. If the node Z detects a failure in the W path in the direction from the node A toward the node Z (S74), the node Z changes the priority of the APS message from SF-P to SF-R and then transmits the resulting APS (SF-R) message to the P path and node C (S75). The node Z also selects the third path.

Upon reception of the APS (SF-R) message, the node A transmits the APS (SF-R) message to the node B (S76) and selects the third path. The APS (SF-R) message destined for the node A arrives there through one or both of the third path and the P path in the direction from the node Z toward the node A.

Upon reception of the APS (SF-R) message, the nodes B and C activate the path between the node B and the node C and permit APS message forwarding through the path. Thus, the third path is used for subsequent APS message exchanges between the node A and the node Z.

Figure 16:
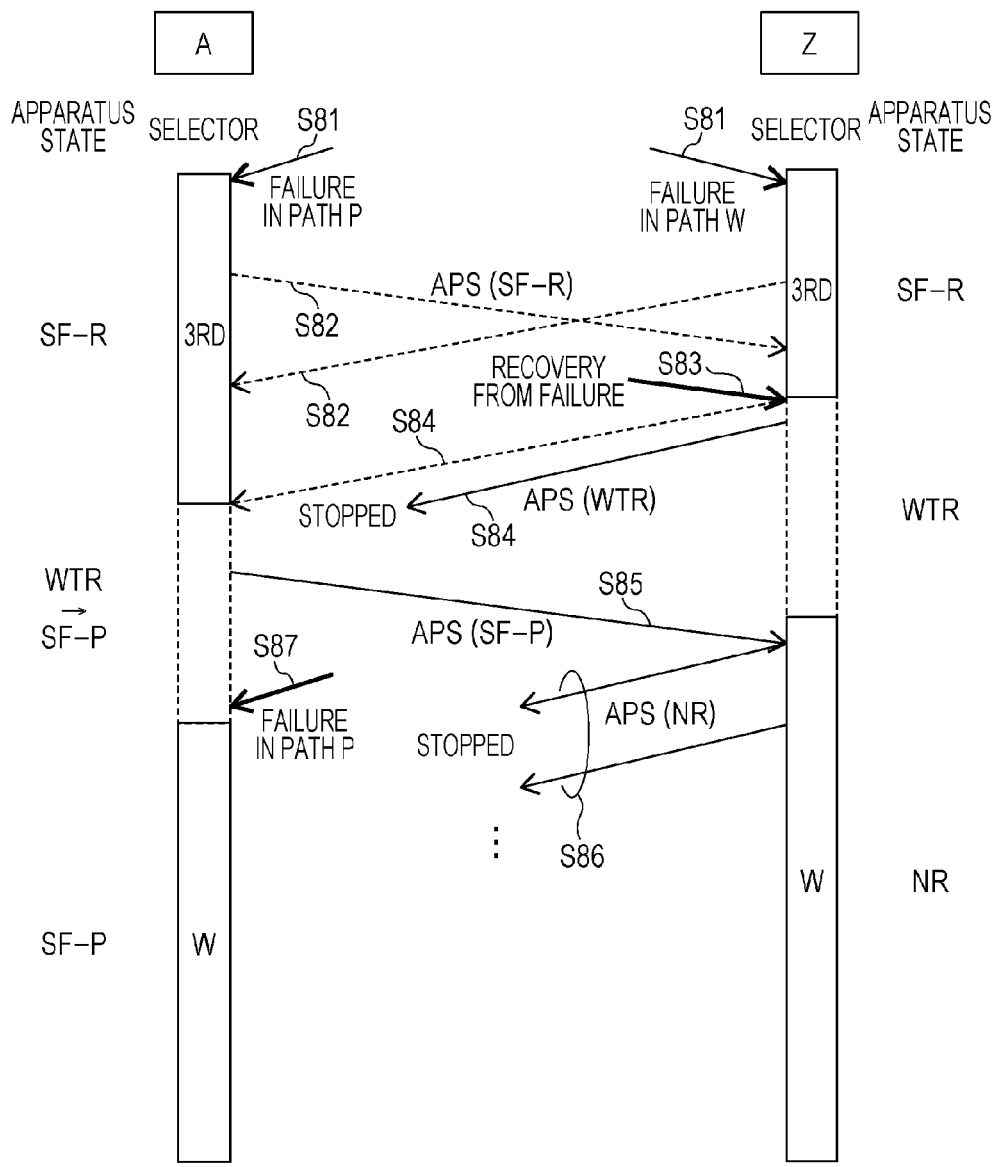
FIG. 16 complements the switchover operation illustrated in FIGS. 10 and 11 with a sequence diagram illustrating a switchover operation performed in a case in which the W path has recovered from the failure on the same side as the node Z.

FIG. 16 illustrates an example of a switching sequence in a case in which the node Z detects a recovery of the W path in a state in which there are a P path failure detected by the node A and a W path failure detected by the node Z. At the node A, the failure in the P path in the direction from the node Z toward the node A will remain detected. As illustrated in FIG. 16, while there are failures in both the W path and the P path (S81), the nodes A and Z exchange APS (SF-R) messages through the third path (S82).

If the node Z detects a recovery of the W path (S83), the node Z changes the priority of the APS message from SF-R to Wait to Restore (WTR) and transmits the resulting APS (WTR) message to the third path and P path (S84). Since the failure in the P path in the direction from the node Z toward the node A continues, however, the APS (WTR) message transmitted to the P path does not reach the node A. Instead, the APS (WTR) message transmitted through the third path reaches the node A.

Upon reception of the APS (WTR) message, the node A changes the priority of the APS message from WTR to SF-P because the failure in the P path remains detected and transmits the resulting APS (SF-P) message to the third path and the P path in the direction toward the node Z (S85).

Upon reception of the APS (SF-P) message through the P path, the node Z selects the W path, changes the priority of the APS message from WTR to NR, and transmits the resulting APS (NR) message to the P path in the direction toward the node A (S86). Since the P path in the direction toward the node A still has a failure, however, the APS (NR) message does not reach the node A.

Since the node A detects a failure in the P path without receiving the APS (NR) message (S87), the node A selects the W path.

Since the nodes B and C receive an APS message other than the APS (SF-R) message, the nodes B and C stop the forwarding of the received APS message and disable the path between the node B and the node C.

When the nodes A and Z select the recovered W path as described above, a switchover is made from the third path back to the W path.

Figure 17:
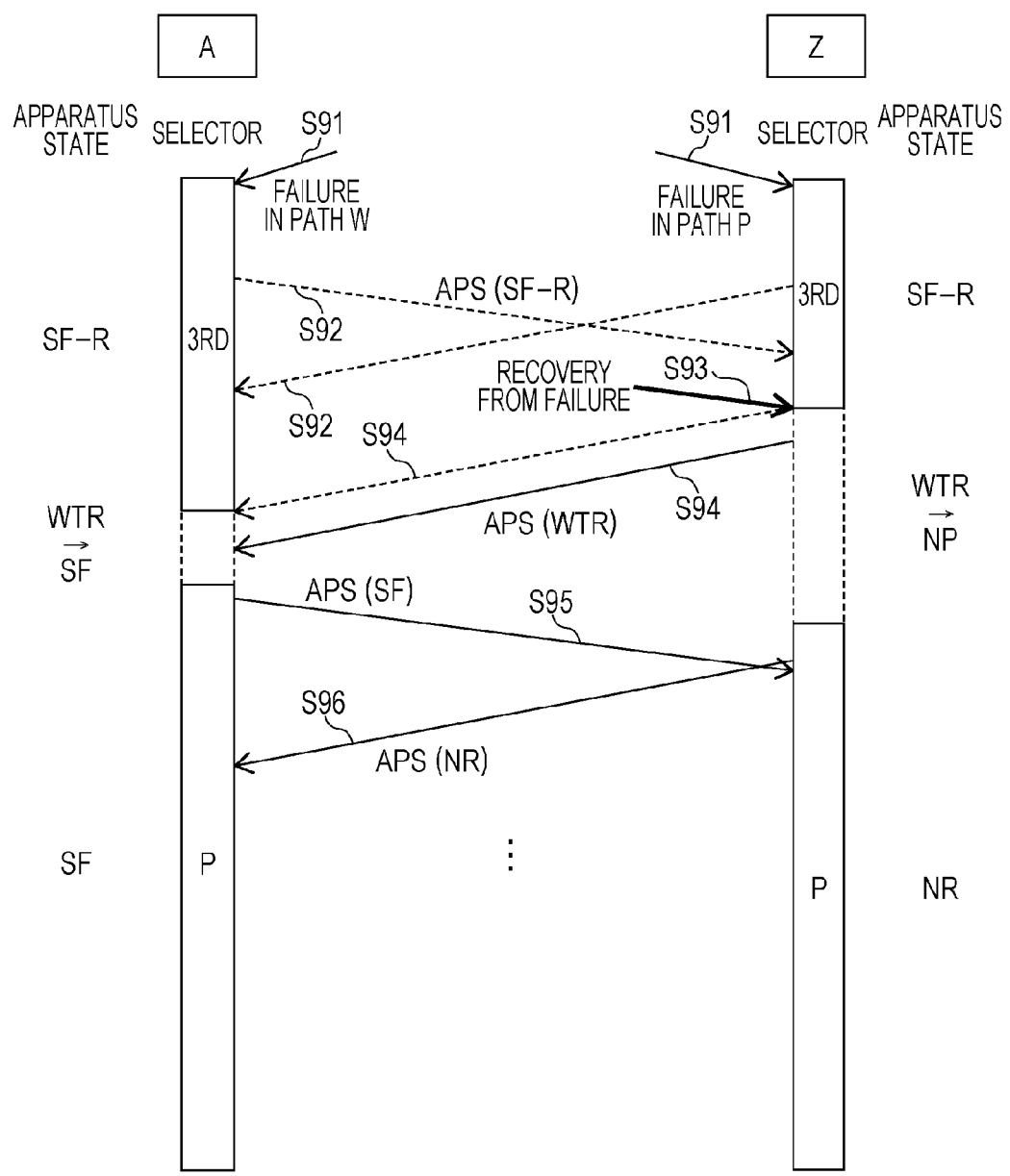
FIG. 17 also complements the switchover operation illustrated in FIGS. 10 and 11 with a sequence diagram illustrating a switchover operation performed in a case in which the P path has recovered from the failure on the same side as the node Z.

FIG. 17 illustrates an example of a switching sequence in a case in which the node Z detects a recovery of the P path in a state in which there are a W path failure detected by the node A and a P path failure detected by the node Z. At the node A, the failure in the W path in the direction from the node Z toward the node A will remain detected. As illustrated in FIG. 17, while there are failures in both the W path and the P path (S91), the nodes A and Z exchange APS (SF-R) messages through the third path (S92).

If the node Z detects a recovery of the P path (S93), the node Z changes the priority of the APS message from SF-R to WTR and transmits the resulting APS (WTR) message to the third path and P path (S94).

The node A receives the APS (WTR) message through one or both of the third path and P path. Upon the receipt of the APS (WTR) message, the node A selects the P path because the failure in the W path remains detected. The node A then changes the priority of the APS message from WTR to SF and transmits the resulting transmits the APS (SF) message to the third path and P path (S95).

Upon reception of the APS (SF) message through the P path, the node Z selects the P path, changes the priority of the APS message from WTR to NR, and transmits the resulting APS (NR) message to the P path (S96).

Upon reception of the APS (NR) message through the P path, the node A continues to select the P path without taking any particular action.

Since the nodes B and C receive an APS message other than the APS (SF-R) message, the nodes B and C stop the forwarding of the received APS message and disable the path between the node B and the node C.

When the nodes A and Z select the recovered P path as described above, a switchover is made from the third path back to the P path.

Figure 18:
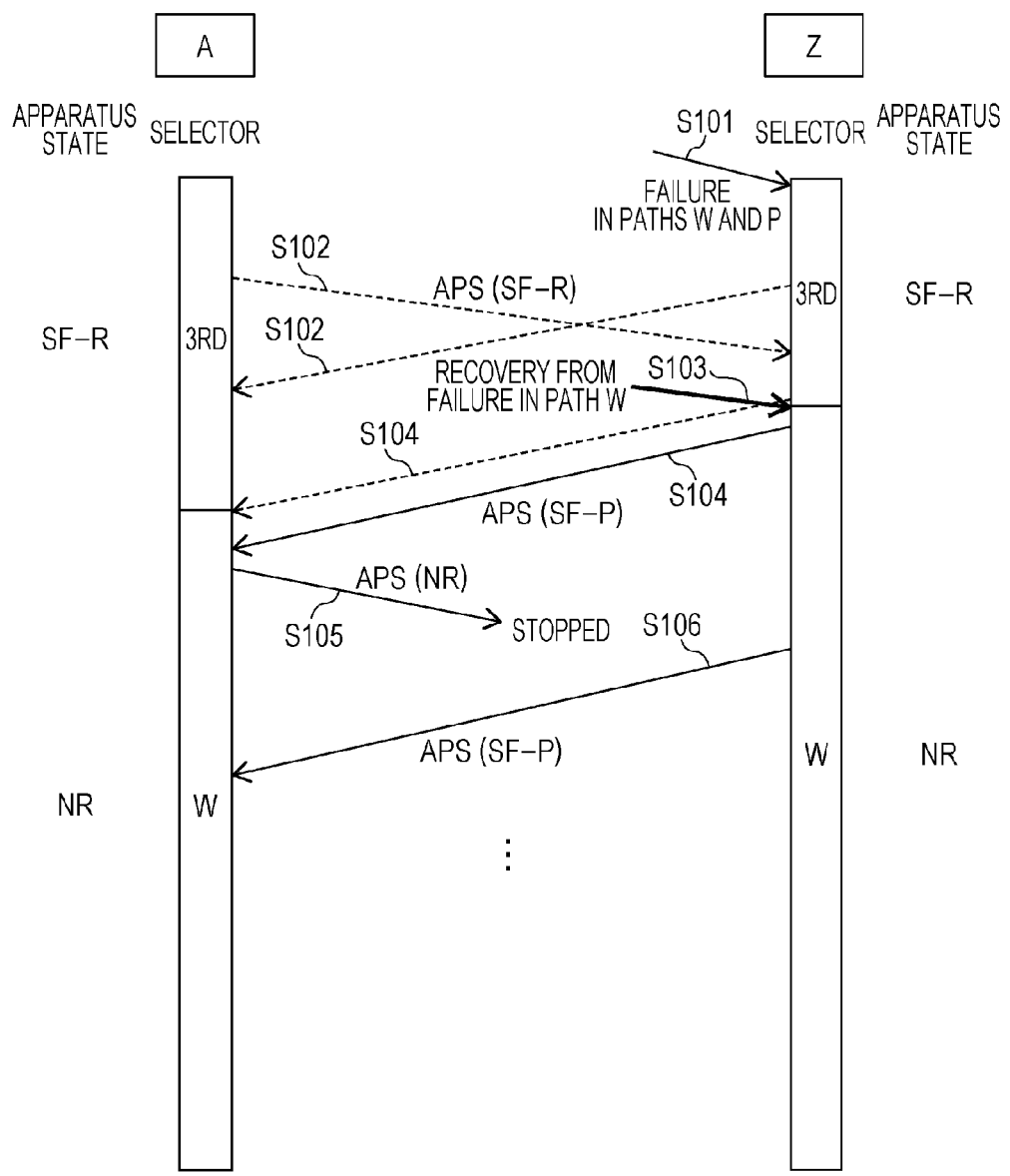
FIG. 18 also complements the switchover operation illustrated in FIGS. 10 and 11 with a sequence diagram illustrating a switchover operation performed in a case in which the W path has recovered from the failure on the same side as the node Z.

FIG. 18 illustrates an example of a switching sequence in a case in which the node Z detects a recovery of the W path in a state in which there are a W path failure and a P path failure detected by the node Z. At the node Z, the failure in the P path in the direction from the node A toward the node Z will remain detected. As illustrated in FIG. 18, while there are failures in both the W path and the P path (S101), the nodes A and Z exchange APS (SF-R) messages through the third path (S102).

If the node Z detects a recovery of the W path (S103), the node Z selects the W path because the failure in the P path remains detected and changes the priority of the APS message from SF-R to SF-P. The node Z then transmits the APS (SF-P) message with the new priority to the third path and the P path in the direction toward the node A (S104).

The node A receives the APS (SF-P) message through one or both of the third path and P path. Upon the receipt of the APS (SF-P) message, the node A selects the W path, changes the priority of the APS message from SF-R to NR, and transmits the resulting APS (NR) message to the third path and P path (S105). Since the P path in the direction from the node A toward the node Z still has a failure, however, the APS (NR) message transmitted to the P path does not reach the node Z.

The node Z continues to select the W path because the node Z does not receive the APS (NR) message transmitted through the P path, and transmits the APS (SF-P) message to the P path in the direction toward the node A because the failure in the P path remains detected (S106).

The node A receives the APS (SF-P) message through the P path. Since the node A is already selecting the W path, however, the node A does not take any particular action (continues to select the W path).

The node B and C receive an APS message other than the APS (SF-R) message, the node B and C stop the forwarding of the received APS message and disable the path between the node B and the node C.

When the nodes A and Z select the recovered W path as described above, a switchover is made from the third path back to the W path.

Figure 19:
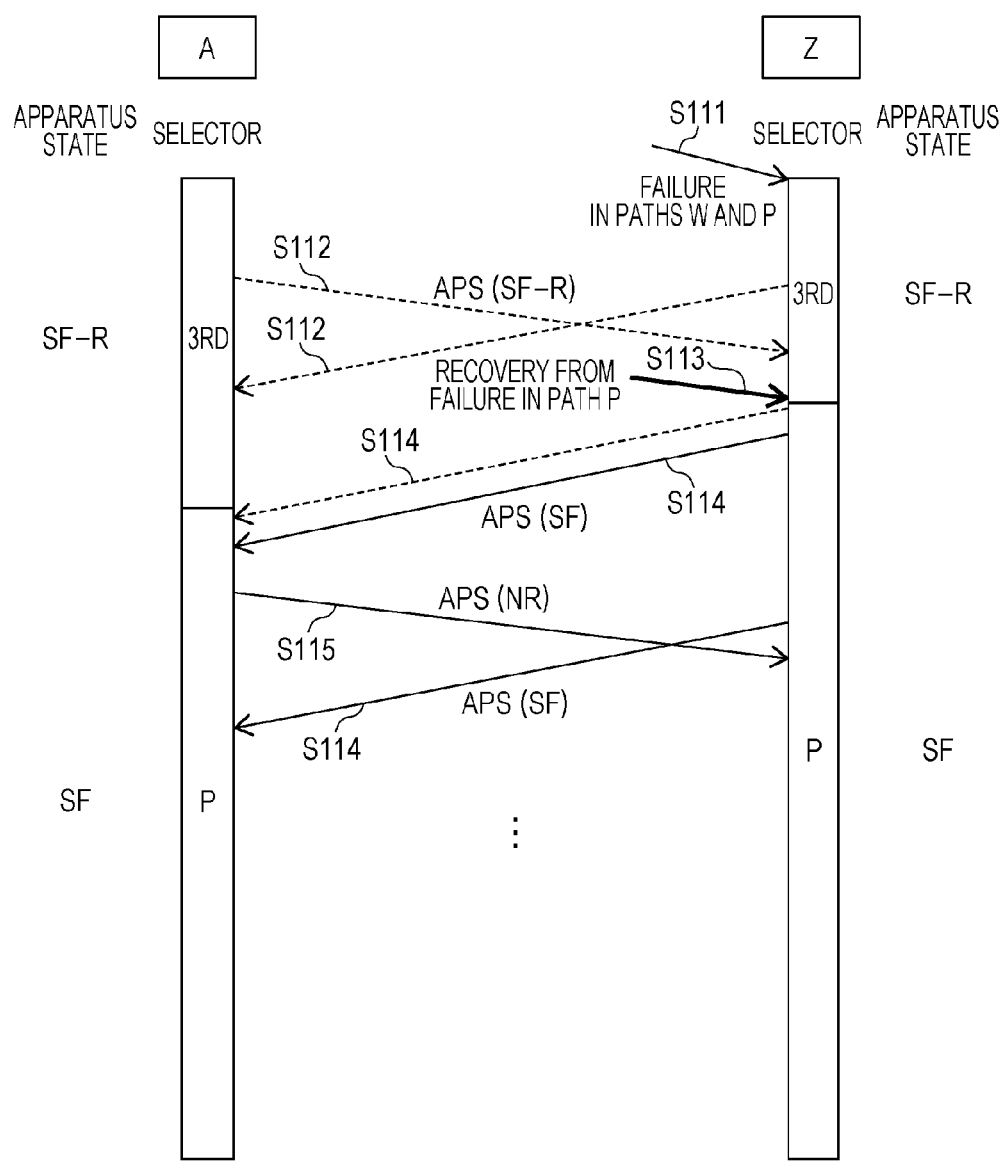
FIG. 19 also complements the switchover operation illustrated in FIGS. 10 and 11 with a sequence diagram illustrating a switchover operation performed in a case in which the P path has recovered from the failure on the same side as the node Z.

FIG. 19 illustrates an example of a switching sequence in a case in which the node Z detects a recovery of the P path in a state in which there are a W path failure and a P path failure detected by the node Z. At the node Z, the failure in the W path in the direction from the node A toward the node Z will remain detected. As illustrated in FIG. 19, while there are failures in both the W path and the P path (S111), the nodes A and Z exchange APS (SF-R) messages through the third path (S112).

If the node Z detects a recovery of the P path (S113), the node Z selects the P path because the failure in the W path remains detected and changes the priority of the APS message from SF-R to SF. The node Z then transmits the APS (SF) message with the new priority to the third path and the P path in the direction toward the node A (S114).

The node A receives the APS (SF) message through one or both of the third path and P path. Upon the receipt of the APS (SF) message, the node A selects the P path, changes the priority of the APS message from SF to NR, and transmits the resulting APS (NR) message to the third path and P path (S115). Since the node Z receives the APS (NR) message through the P path, the node Z continues to select the P path.

The nodes B and C receive an APS message other than the APS (SF-R) message, the nodes B and C stop the forwarding of the received APS message and disable the path between the node B and the node C.

When the nodes A and Z select the recovered P path as described above, a switchover is made from the third path back to the P path.

Example of the Structures of the Nodes A and Z

Figure 20:
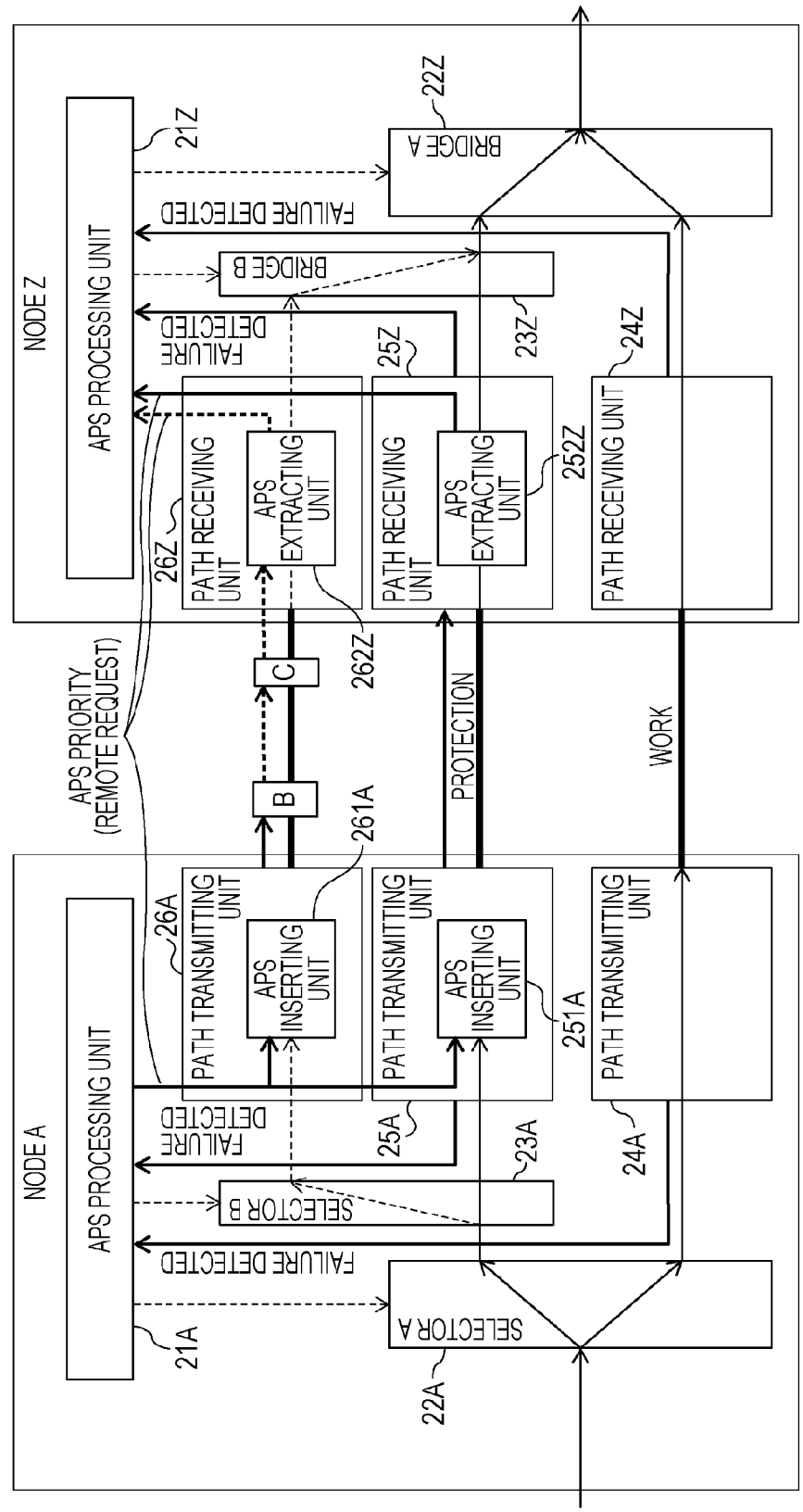
FIG. 20 is a block diagram illustrating an example of the structures of the nodes A and Z in FIGS. 5 to 19.

Next, FIG. 20 illustrates an example of the structures of the nodes A and Z. The structure example in FIG. 20 assumes that the Ethernet (registered trademark) or MPLS is used as an example of a transfer technology to implement packet transmission. The structure example in FIG. 20 focuses on processing involved in APS on transfer paths in the direction from the node A toward the node Z. A structure with transfer paths in the opposite direction from the node Z toward the node A is the same as in FIG. 20 if the nodes A and Z in FIG. 20 are respectively read as referring to the node Z and node A.

The node A in FIG. 20 includes, for example, an APS processing unit 21A and also includes a selector (A) 22A, a selector (B) 23A, a path transmitting units 24A, 25A and 26A as an example of a transmission system. The node Z in FIG. 20 includes, for example, an APS processing unit 21Z and also includes a bridge (A) 22Z, a bridge (B) 23Z, and path receiving units 24Z, 25Z and 26Z as an example of a reception system.

The APS processing units 21A and 21Z perform APS processing (such as, for example, the setting and modification of the APS message priority) according to the states of failures detected in the W path and P path. At the node A, a failure in the W path from the node Z toward the node A is detected by, for example, the path transmitting unit 24A for the W path and a failure in the P path from the node Z toward the node A is detected by, for example, the path transmitting unit 25A for the P path. At the node Z, a failure in the W path from the node A toward the node Z is detected by, for example, the path receiving unit 24Z for the W path and a failure in the P path from the node A toward the node Z is detected by, for example, the path receiving unit 25Z for the P path.

The priority of the APS message obtained from the APS processing unit 21A in the node A is transmitted to the path transmitting units 25A and 26A (the priority of the APS message may also be referred to below as the APS priority). The path transmitting unit 25A transmits a packet to the P path. The path transmitting unit 26A transmits a packet to the node B through the third path. The path transmitting units 25A and 26A, which respectively include an APS inserting unit 251A and an APS inserting unit 261A, insert an APS message with an APS priority assigned by the APS processing unit 21A into a transmission packet.

The selector 22A in the node A selects one of the W path and P path under control by the APS processing unit 21A. Specifically, during a normal operation, the selector 22A selects the W path and transmits a received packet to the path transmitting unit 24A corresponding to the W path; if a failure is detected in the W path, the selector 22A selects the P path and transmits a received packet to the path transmitting unit 25A corresponding to the P path.

The selector 23A selects one of the P path and third path under control by the APS processing unit 21A. Specifically, if no failure has been detected in at least one of the W path and P path, the selector 23A selects the P path and transmits a packet received through the selector 22A to the path transmitting unit 25A corresponding to the P path; if a failure has been detected in both the W path and the P path, the selector 23A selects the third path and transmits a packet received through the selector 22A to the path transmitting unit 26A corresponding to the third path.

Next, the node Z will be noted. The path receiving unit 24Z receives a packet through the W path and transmits the packet to the bridge 22Z. The path receiving unit 25Z receives a packet through the P path and transmits the packet to the bridge 23Z. The path receiving unit 26Z receives a packet through the third path (from the node C) and transmits the packet to the bridge 23Z.

The path receiving unit 25Z includes an APS extracting unit 252Z, and the path receiving unit 26Z includes an APS extracting unit 262Z. The APS extracting unit 252Z extracts the APS messages inserted by its corresponding APS inserting unit 251A in the node A. Similarly, the APS extracting unit 262Z extracts the APS messages inserted by its corresponding APS inserting unit 261A in the node A. Each extracted APS message is transmitted to the APS processing unit 21Z, where APS processing is performed according to the priority of the received APS message.

The bridge 22Z selects one of the W path and P path under control by the APS processing unit 21Z. Specifically, during a normal operation, the bridge 22Z selects an output from the path receiving unit 24Z corresponding to the W path; if a failure is detected in the W path, the bridge 22Z selects the path receiving unit 25Z (an output from the bridge 23Z) corresponding to the P path.

The bridge 23Z selects one of the P path and third path under control by the APS processing unit 21Z. Specifically, if no failure has been detected in at least one of the W path and P path, the bridge 23Z selects an output from the path receiving unit 25Z corresponding to the P path and transmits the output to the bridge 22Z; if a failure has been detected in both the W path and the P path, the bridge 23Z selects an output from the path receiving unit 26Z corresponding to the third path and transmits the output to the bridge 22Z.

That is, when the selector 23A in the node A and the bridge 23Z in the node Z are controlled, a path through which user traffic (client signals) flows can be switched between the P path and the third path. As an example, the user traffic can be switched to the third path after a failure is detected in both the W path and the P path and an APS (SF-R) message is received through the third path.

The selectors 22A and 23A and the bridges 22Z and 23Z each function as an example of a path selecting unit that selects one of the W path, P path, and third path. The APS inserting unit 251A in the path transmitting unit 25A and the APS inserting unit 261A in the path transmitting unit 26A each function as an example of a control signal transmitting unit that transmits an APS (SF-R) message, which is an example of a control signal, to the P path and third path when a failure is detected in both the W path and the P path. The APS processing units 21A and 21Z each function as an example of a control unit that controls their corresponding path selecting units so that the third path is selected according to transmission of an APS (SF-R) message or reception of an APS (SF-R) message through the P path or third path.

Example of the Structures of the APS Processing Units

Figure 21:
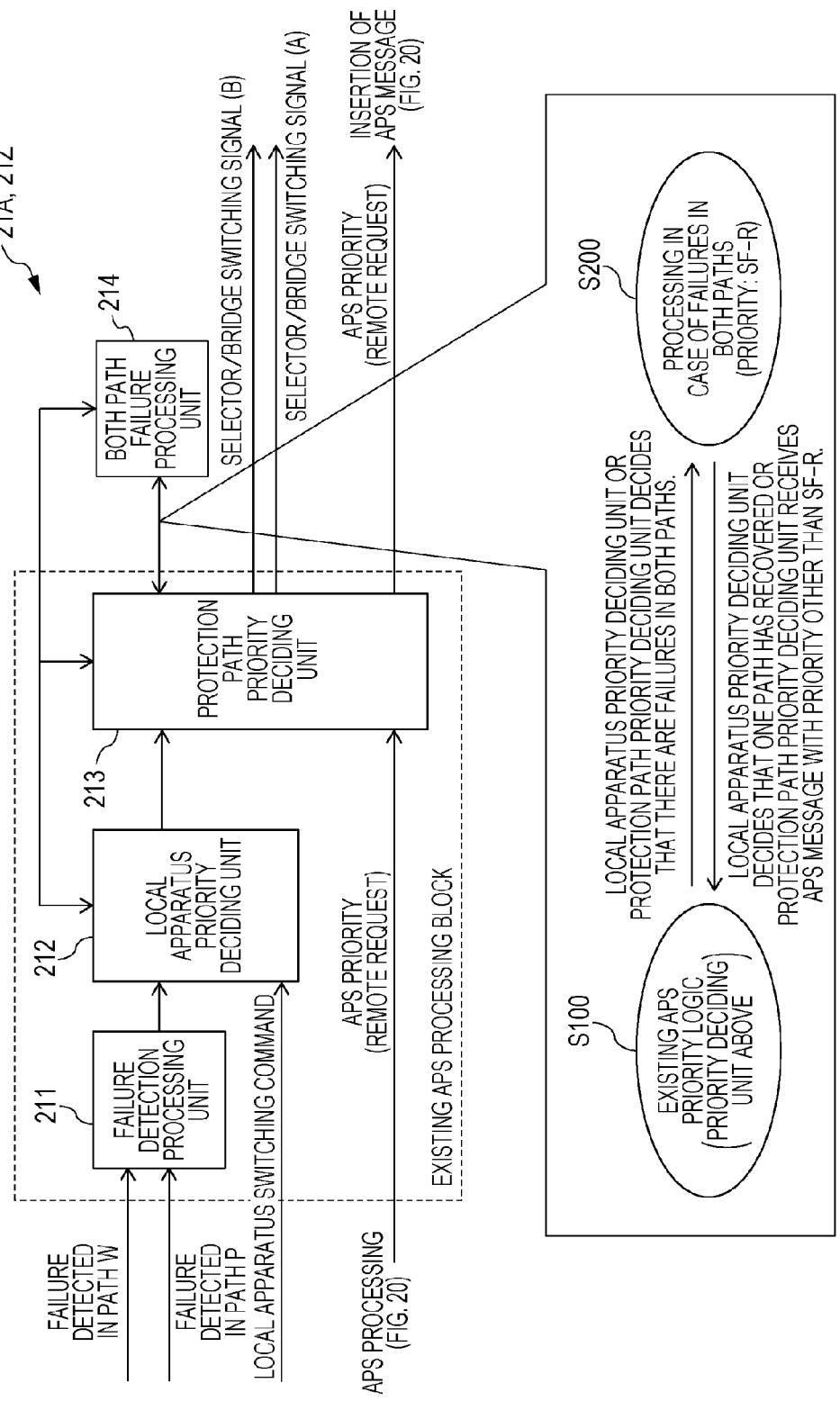
FIG. 21 is a block diagram illustrating an example of the structure of APS processing units in FIG. 20.

FIG. 21 illustrates an example of the structures of the APS processing unit 21A in the node A and the APS processing unit 21Z in the node Z described above. The APS processing units 21A and 21Z in FIG. 21 each include a failure detection processing unit 211, a local apparatus priority deciding unit 212, a protection path priority deciding unit 213, and a both path failure processing unit 214, as an example.

The failure detection processing unit 211 identifies whether both the W path and the P path are normal or whether a failure has been detected in one or both of the W path and P path, and transmits an identification result to the local apparatus priority deciding unit 212.

The local apparatus priority deciding unit 212 receives an identification result transmitted from the failure detection processing unit 211, the identification result being related to a failure, and a local apparatus switching command, and determines which of them is to be prioritized. When, for example, the selector 22A, the selector 23A, or both (or the bridge 22Z, the bridge 23Z, or both) are forcibly switched, the local apparatus switching command is an example of a user command entered by, for example, an operator. In this case, the local apparatus priority deciding unit 212 transmits the local apparatus switching command to the protection path priority deciding unit 213 regardless of the failure-related identification result given by the failure detection processing unit 211.

The protection path priority deciding unit 213 decides whether a failure has been detected in both the W path and the P path according to the determination result given by the local apparatus priority deciding unit 212 or the priority of the APS message received from the opposing node. If no failure has been detected in at least one of the W path and P path, the protection path priority deciding unit 213 gives an APS priority to the APS inserting unit 251A so that an APS message is signaled through the P path and controls the selectors 22A and 23A (or bridges 22Z and 23Z) to control a traffic switchover between the W path and the P path.

If the protection path priority deciding unit 213 decides that a failure has been detected in both the W path and the P path, processing by the both path failure processing unit 214 is enabled (in FIG. 21, the state in S100 shifts to the state in S200). With a failure detected in both the W path and the P path, the both path failure processing unit 214 commands the protection path priority deciding unit 213 to set the priority of an APS message to be transmitted to the APS inserting units 251A and 261A to SR-R.

Upon reception of the command, the protection path priority deciding unit 213 gives the SF-R APS priority to the APS inserting units 251A and 261A and controls the selectors 22A and 23A (or bridges 22Z and 23Z) to activate the third path.

If the local apparatus priority deciding unit 212 is notified that at least one of the W path and P path has been recovered or the protection path priority deciding unit 213 receives an APS message with a priority other than SF-R, processing by the both path failure processing unit 214 is terminated. Processing by the local apparatus priority deciding unit 212 and protection path priority deciding unit 213 is then enabled (in FIG. 21, the state in S200 shifts to the state in S100).

That is, since no failure has been detected in at least one of the W path and P path, the protection path priority deciding unit 213 gives an APS priority to the APS inserting unit 251A so that an APS message is signaled through the P path and controls the selectors 22A and 23A (or bridges 22Z and 23Z) to control a traffic switchover between the W path and the P path.

FIG. 22 illustrates an example of the format of an APS message. The format in FIG. 22 is stipulated in ITU-T Recommendation G.8031; Request/State (in four bits) is specified as information indicating an APS priority described above. Specifically, one of 12 APS priorities is specified with four bits.

For example, 1110 indicates SF-P, 1011 indicates SF, 0101 indicates WTR, and 0000 indicates NR. Since a bit pattern indicating SF-R described above is newly defined in Request/State, an operation to provide a third path becomes possible only when a failure has occurred in both the W path and the P path. In other words, if the new priority SF-R is added to the existing APS priority logic, the above operation becomes possible. Therefore, the provision of a third path and a switchover at the occurrence of a failure become possible under simple control based on a single type of APS messages with different priorities, without having to use individual control signals or the like.

Example of the Structures of the Node B and Node C

Figure 23:
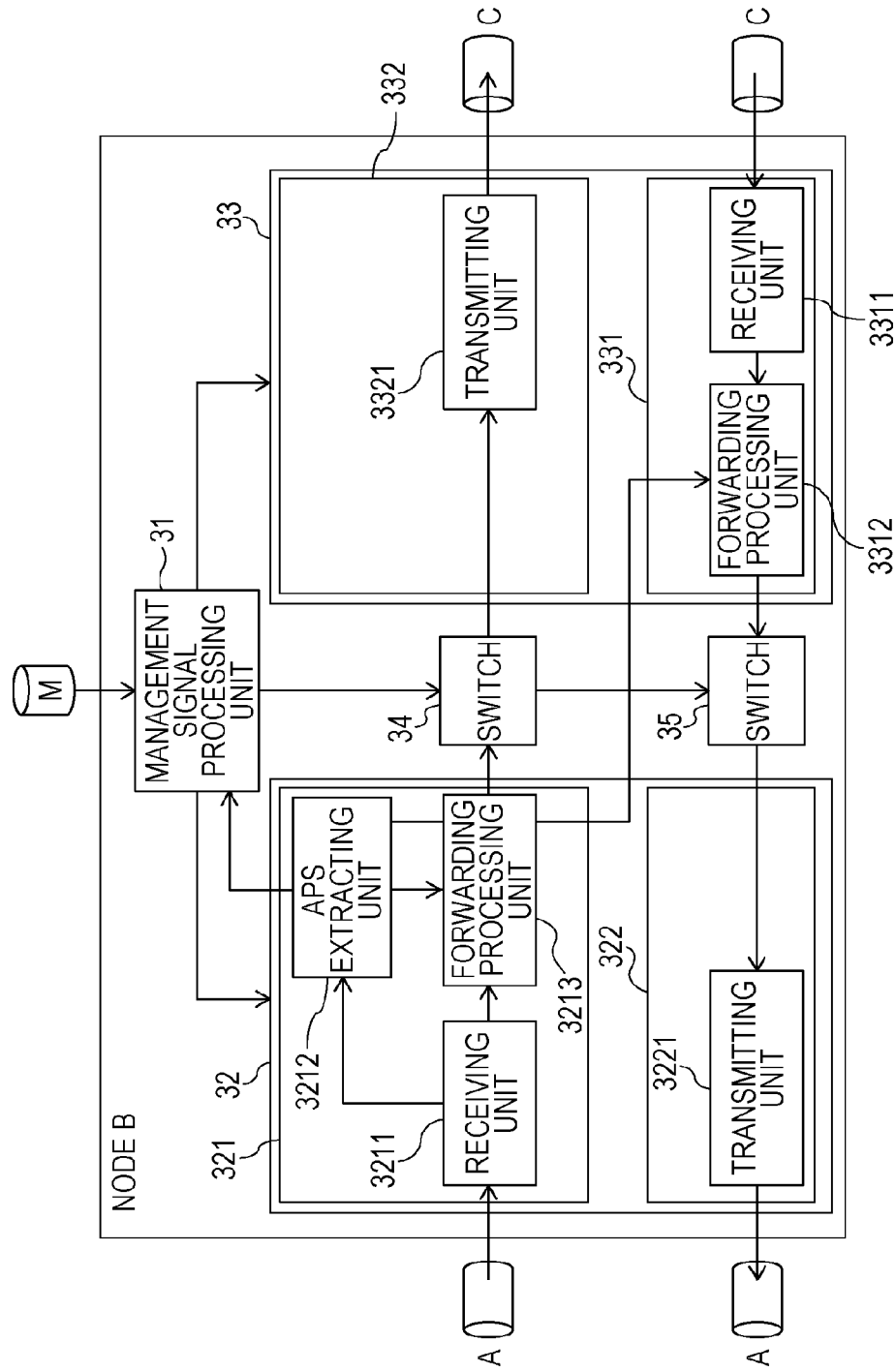
FIG. 23 is a block diagram illustrating an example of the structure of the node B (or node C) in FIGS. 5 to 19.

FIG. 23 illustrates an example of the structure of the node B illustrated in FIG. 5. The node B in FIG. 23 includes a management signal processing unit 31, a communication interface 32 with the node A, a communication interface 33 with the node C, and switches 34 and 35, as an example.

The management signal processing unit 31 controls the communication interface 32, communication interface 33, and switches 34 and 35 and makes their settings in response to control signals and setting signals received from the management apparatus M illustrated in FIGS. 6 and 7 or according to an APS message processing result received from the node A. The above control and setting include, for example, the pass setting and APS setting described above with reference to FIGS. 6 and 7.

That is, when a path to the communication interface 32 is set, a path is connected between the node A and the node B; when a path to the communication interface 33 is set, a path is connected between the node B and the node C. When the switch 34, the switch 35, or both are controlled, the path between the node A and the node B and the path between the node B and the node C can be connected and disconnected.

The communication interface 32 with the node A and the communication interface 33 with the node C each include a transmission and reception interface that supports a transfer method applied between the node A and the node Z, as an example. The communication interface 33 with the node C is only requested to support the transfer method supported by the third path; in some cases, the communication interface 33 may not support a transfer method applied between the node A and the node Z. In other words, the transfer method applied between the node A and the node Z may differ from the transfer method applied between the node B and the node C.

The communication interface 32 with the node A includes a reception interface 321 and a transmission interface 322. The reception interface 321 includes a receiving unit 3211 and an APS extracting unit 3212, and a forwarding processing unit 3213, as an example. The transmission interface 322 includes a transmitting unit 3221 as an example.

The receiving unit 3211, which supports a transfer method corresponding to the path transmitting unit 26A (see FIG. 20) in the node A as an example, performs reception processing on a signal (a packet, for example) transmitted from the node A. The reception processing includes, for example, format conversion suitable for the transfer method applied between the node B and the node A.

The forwarding processing unit 3213 forwards the packet on which reception processing has been performed at the receiving unit 3211 to the switch 34 (that is, to the node C) or stops the forwarding under control by the APS extracting unit 3212 (according to the APS processing result).

The APS extracting unit 3212 extracts an APS message from the packet on which reception processing has been performed at the receiving unit 3211. The forwarding processing unit 3213 is controlled according to the priority of the extracted APS message to control the forwarding of the packet on which reception processing has been performed at the receiving unit 3211 to the node C. If, for example, the APS message received from the node A does not have a particular priority (SF-R), the forwarding by the forwarding processing unit 3213 is stopped and the APS message is terminated without being forwarded to the node C.

If the APS message received from the node A has the SF-R priority, forwarding by the forwarding processing unit 3213 is permitted and the switch 34 is controlled by the management signal processing unit 31 so that the APS message is forwarded to the node C. That is, the management signal processing unit 31 functions as an example of a control unit that, upon reception of an APS (SF-R) message at the receiving unit 3211, activates the third path between the node A and the node Z and forwards the APS (SF-R) message to the third path.

The receiving unit 3211 in the transmission interface 322 performs transmission processing on a signal (a packet, for example) received from the communication interface 33 with the node C through the switch 35. The transmission processing includes, for example, format conversion suitable for the transfer method applied between the node B and the node A.

The communication interface 33 with the node C includes a reception interface 331 and a transmission interface 332 as an example. The reception interface 331 includes a receiving unit 3311 and a forwarding processing unit 3312 as an example. The transmission interface 332 includes a transmitting unit 3321 as an example.

The receiving unit 3311 performs reception processing on a signal (a packet, for example) received from the node C. The reception processing includes, for example, format conversion suitable for the transfer method applied between the node B and the node C.

The forwarding processing unit 3312 forwards the packet on which reception processing has been performed at the receiving unit 3311 to the switch 35 (that is, to the node A) or stops the forwarding under control by the APS extracting unit 3212. If, for example, the APS message received from the node A does not have a particular priority (SF-R), the forwarding by the forwarding processing unit 3312 is stopped and the packet forwarding to the node A is stopped.

If the APS message received from the node A has the SF-R priority, forwarding by the forwarding processing unit 3312 is permitted and the switch 35 is controlled by the management signal processing unit 31 so that the packet received from the node C is forwarded to the node A.

In other words, forwarding by the forwarding processing units 3213 and 3312, each of which corresponds to a mutually different direction of the two directions, is controlled according to the APS processing result given by the APS extracting unit 3212 shared by them, so APS processing on the packet received from the node C is suppressed.

The transmitting unit 3321 in the transmission interface 332 performs transmission processing on a signal (a packet, for example) received from the communication interface 32 with the node A through the switch 34. The transmission processing includes, for example, format conversion suitable for the transfer method applied between the node B and the node C.

The structure of the node C is the same as the above structure illustrated in FIG. 23 if, in the drawing, the node A is read as referring to the node Z and the node C is read as referring to the node B.

Due to the structure and operation described above, the node B (or node C) can perform forwarding to the node C (or node B) and processing to connect the path between the node A and the node B (or between the node Z and the node C) to the path between the node B and the node C (or between the node C and the node B), according to the APS processing result in the node A (or node Z). When forwarding processing is performed, the opposing node is notified of an APS message together with the packet (the APS message is forwarded to the opposing node together with the packet). Only when a failure has occurred in both the W path and the P path and the APS message has a particular priority (SF-R), the third path passing through the nodes B and C is activated and a switchover to the third path can be made.

In other words, the third path assumes an operation (provision of a path) performed in a case in which a failure occurs in both the W path and the P path and enables an APS operation linked to confirmation of an APS message flow in the existing P path. Thus, even if a failure occurs in both the W path and the P path, a redundant architecture (n:1 or (1+1):1) including a third path, which has been difficult to achieve in the conventional APS processing, can be provided in a single piece of APS processing. That is, the use of only a single switching management system is possible. When the W path or P path is recovered, an operation to quickly switch back from the third path to the recovered path can be performed.

First Variation

In the embodiment described above, it has been assumed that a third path passing through the nodes A, B, C, and Z is set (prepared) in advance as described above with reference to FIGS. 6 and 7. Between the node B and the node C, however, a path may be set after, for example, a failure occurs in one of the W path and P path.

Figure 24:
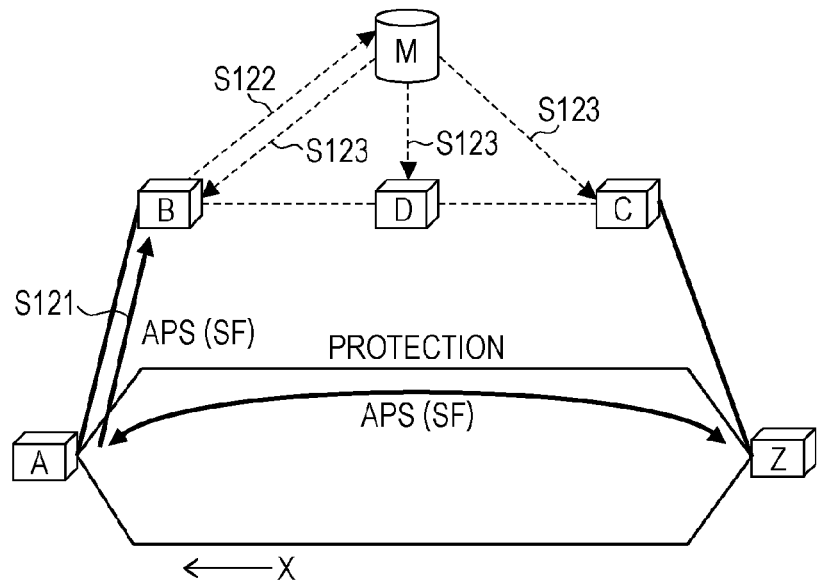
FIG. 24 illustrates a first variation of an embodiment.

FIG. 24 illustrates the above concept. If a failure occurs in, for example, the W path (or P path), one of the nodes A and Z receives an APS message with the SF (or SF-P) priority from the opposing node Z or node A through the P path and transmits the APS message to the adjacent node B (or node C) (S121).

In response to the received APS (SF or SF-P) message, the node B (or node C) requests the management apparatus M to set a path between the node B and the node C (S122). Upon reception the request, the management apparatus M calculates a path between the node B and the node C and sets the path at relevant nodes (nodes B, C, and D in the example in FIG. 24) (S123). The path may be set by a management layer of NMS or the like (under centralized control) or may be set under dispersed control in a data layer such as in GMLS signaling.

Figure 25:
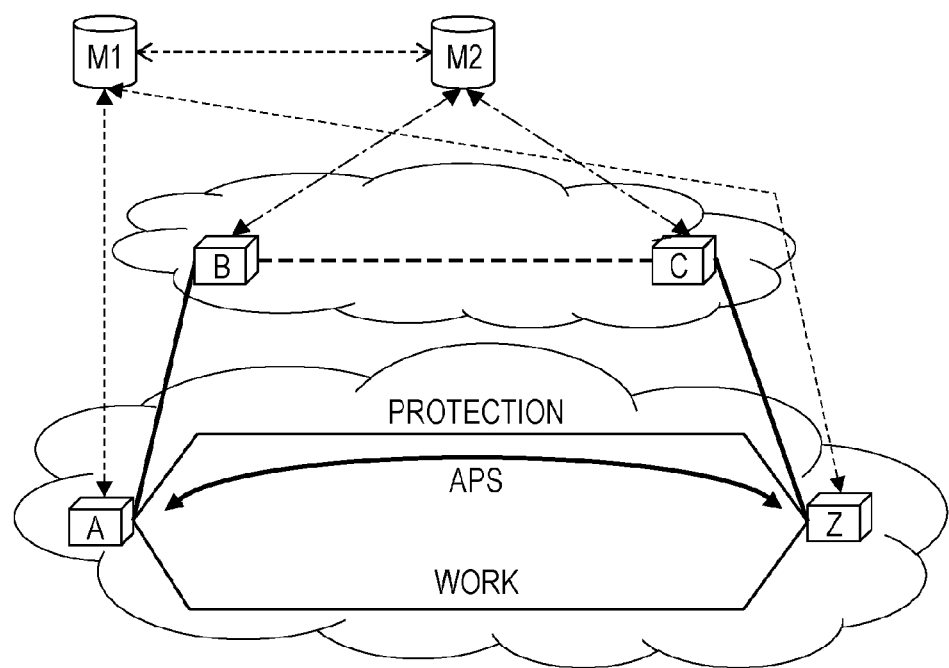
FIG. 25 also illustrates the first variation of the embodiment.

This idea can also be applied to a case in which the nodes A and Z and the nodes B and C are in different domains (that is, are managed by different companies) as illustrated in, for example, FIG. 25. Specifically, in the example in FIG. 25, a management apparatus M1 manages the nodes A and Z, and a management apparatus M2 manages the nodes B and C. In this case as well, if a failure occurs in one of the W path and P path between the node A and the node Z, when the node B or node C requests the management apparatus M2 to set a path, a path can be set between the node B and the node C. If the management apparatuses M1 and M2 are mutually interfaced, the node A or Z may request the management apparatus M2 to set a path between the node B and the node C through the management apparatus M1.

Figure 26:
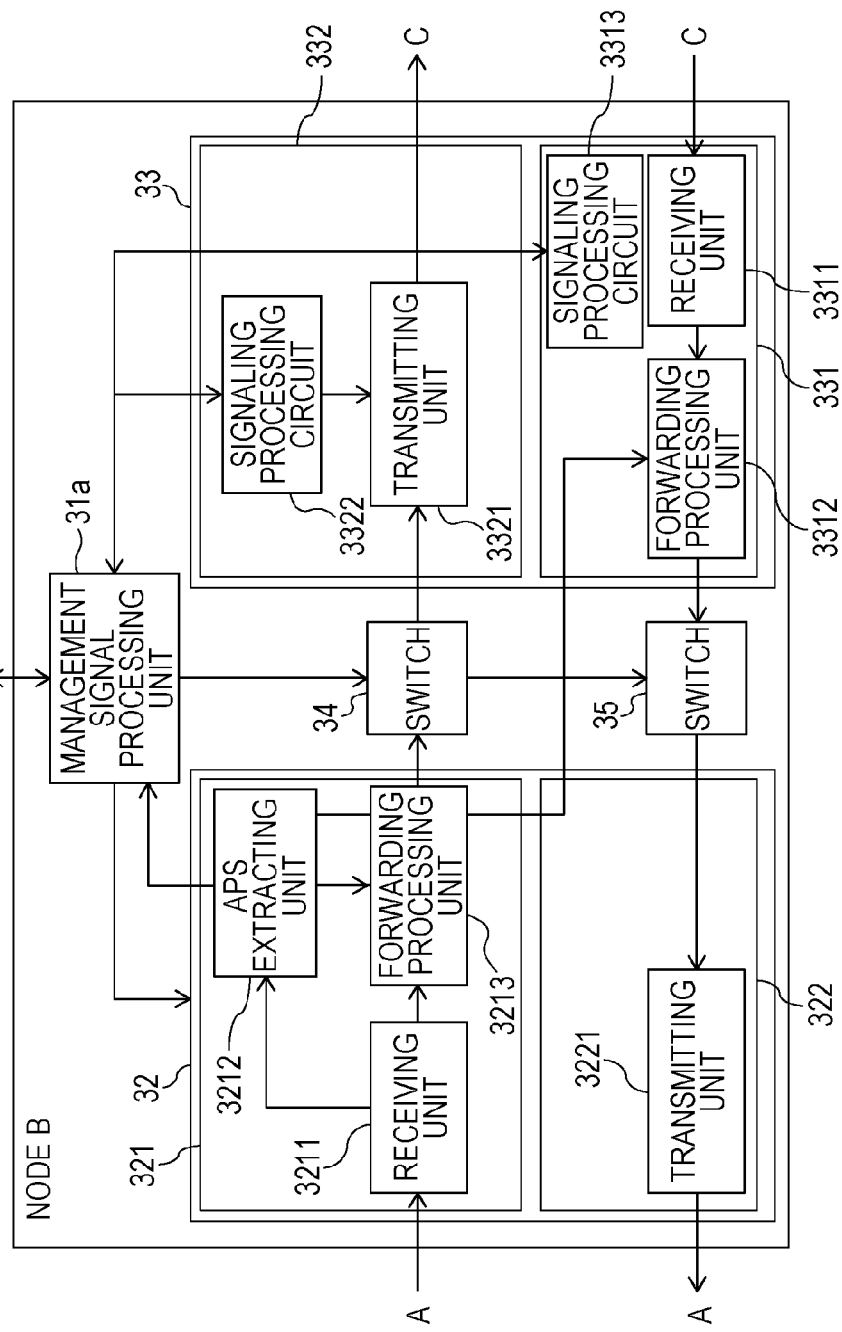
FIG. 26 is a block diagram illustrating an example of the structure of the node B (or node C) in the first variation in FIGS. 24 and 25.

FIG. 26 illustrates an example of the node B in the first variation. The node B in FIG. 26 assumes that a path is set between the node B and the node C by signaling, as an example. The structure of the node B exemplified in FIG. 26 differs from the structure exemplified in FIG. 23 in that a management signal processing unit 31a is provided instead of the management signal processing unit 31 and that the communication interface 33 with the node C includes a signaling processing circuit 3313 in the reception interface 331 and a signaling processing circuit 3322 in the transmission interface 332.

The management signal processing unit 31a not only has functions similar to those of the management signal processing unit 31 described above but also, upon reception of an APS message with the SF or SF-P priority from the APS extracting unit 3212, requests the management apparatus M1 or M2 for information about the path between the node B and the node C. Upon reception of the information about the path between the node B and the node C from the management apparatus M1 or M2, the management signal processing unit 31a transmits the received path information to the signaling processing circuits 3313 and 3322.

The signaling processing circuits 3313 and 3322 create a path setting control signal from the path information received from the management signal processing unit 31a, and sets a path by transmitting and receiving the control signal to and from the node C. The control signal is a message that, for example, defines information about the node D and other nodes through which the third path passes as an explicit route. As an unrestricted example, Resource Reservation Protocol-Traffic Engineering (RSVP-TE) in the label distribution protocol in MPLS can be applied.

In the first variation described above, even if a third path passes through a domain managed by a company other than the company that manages the W path and P path, the embodiment described above can be applied. A possible example is that both a W path and a P path are set on the same side as the Pacific Ocean in Japan and is managed by a company and a third path is set on the same side as the Sea of Japan and is managed by another company.

Second Variation

As described above with reference to FIGS. 21 and 22, a third path can be added to a W path and a P path by expanding ITU-T Recommendation G.8031, so the third path can be provided in a packet transfer method based on the Ethernet (registered trademark) or MPLS. An APS message can be implemented as an example of a control signal (control message) in the Operation, Administration, and Maintenance (OAM). Path setting, path switching, and the like are also possible as described above with reference to FIGS. 20 to 23. Specifically, in APS insertion and APS extraction processing described with reference to FIG. 20, a control message defined in ITU-T Recommendation G.8031 or the like is used and, in APS extraction processing described with reference to FIG. 23, the received control message is extracted (terminated) at a normal time.

Figure 27:
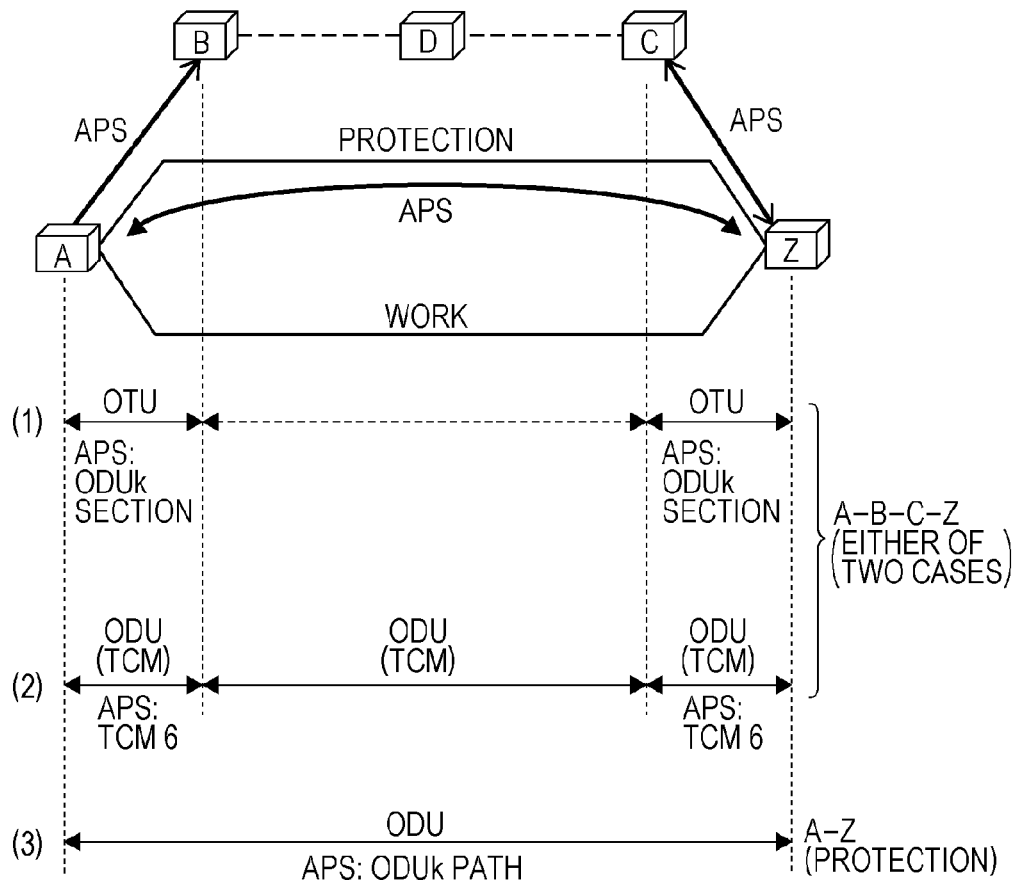
FIG. 27 illustrates a second variation of the embodiment.

A third path can also be provided in protection of lines through which APS messages as stipulated in the Optical Data Unit (ODU) in the Optical Transport Network (OTN) can be provided. FIG. 27 conceptually illustrates the provision of a third path in the OTN (ODU).

Figure 28:
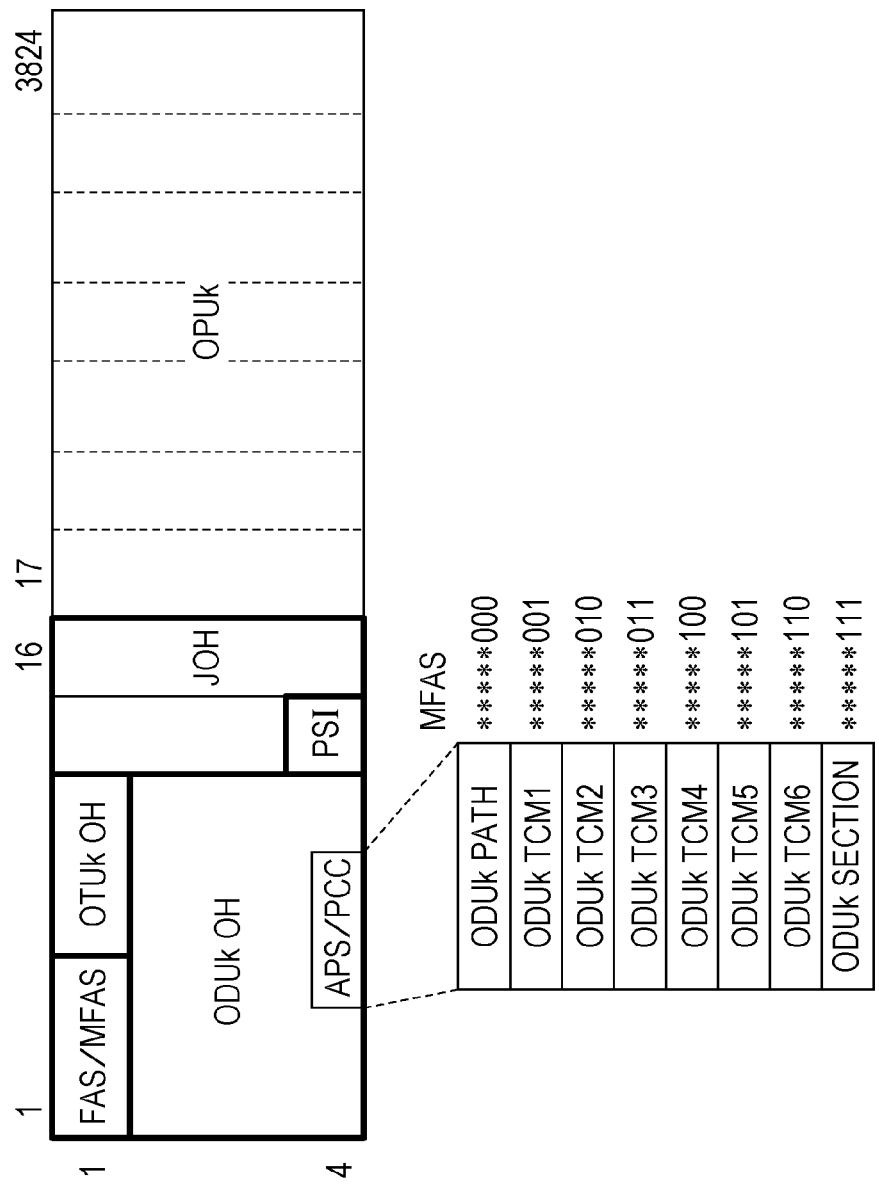
FIG. 28 illustrates an example of the format of the OTU, ODU, and OPU frames stipulated in ITU-T Recommendation G.709.

To provide an OTN (ODU) path, a so-called Tandem Connection Monitoring (TCM) segment can be set as stipulated in ITU-T Recommendation G.709, so APS messages can be defined in TCM units. FIG. 28 illustrates an example of the format of the OTU, ODU, and OPU frames. The frame illustrated in FIG. 28 includes an overhead (OH) field with a size of 16 bytes from the first column to the sixteenth byte by four rows and an Optical Channel Payload Unit k (OPUk) payload field with a size of 3808 bytes from the seventeenth column to the 3824th byte by four rows.

The overhead field, which is used for management of connection and quality, includes a Frame Alignment Signal (FAS)/Multiframe Alignment Signal (MFAS) overhead, an OTUk overhead, an ODUk overhead, and an OPUk overhead (JOH: justification overhead). In the fifth to eighth columns in the fourth row in the ODUk overhead, a four-byte protection communication control channel (APS/PCC) field is defined. The APS/PCC field is used to indicate a connection monitoring level.

As illustrated in FIG. 28, the APS/PCC field indicates one of eight connection monitoring levels with the three-bit MFAS in the sixth to eight columns. A payload structure identifier (PSI) defined in the fifteenth column in the fourth row in the OPUk overhead is information used to identify the structure of the payload field. The PSI can be used to identify the type of a client signal mapped in the payload field such as, for example, Asynchronous Transfer Mode (ATM), Synchronous Transport Module (STM), Generic Frame Procedure (GFP), or Fiber Channel (FC).

As for the P path between the node A and the node Z, an APS message is transmitted by using the ODUk path (MFAS: 000 in FIG. 28) indicated in the APS/PCC field, as illustrated in case (3) in FIG. 27. As for the path between the node A and the node B and the path between the node C and the node Z, an APS message is transmitted by using an ODUk section or ODUk TCM6 (MFAS: 111 or 110 in FIG. 28), as illustrated in cases (1) and (2) in FIG. 27.

In case (1), in which the ODUk section (MFAS: 111) is used, an ODUk path has not been set in advance among the nodes A, B, C, and Z illustrated in FIG. 27, that is, a case as described in the first variation is assumed between the node B and the node C. In case (2), in which ODUk TCM6 (MFAS: 110) is used, an ODUk path has been set among the nodes A, B, C, and Z; the nodes A, B, C, and Z process an APS message as TCM of an already-set ODUk path.

In all cases (1) to (3), traffic set between the node A and the node B and between the node C and the node Z is so-called extra traffic.

Figure 29:
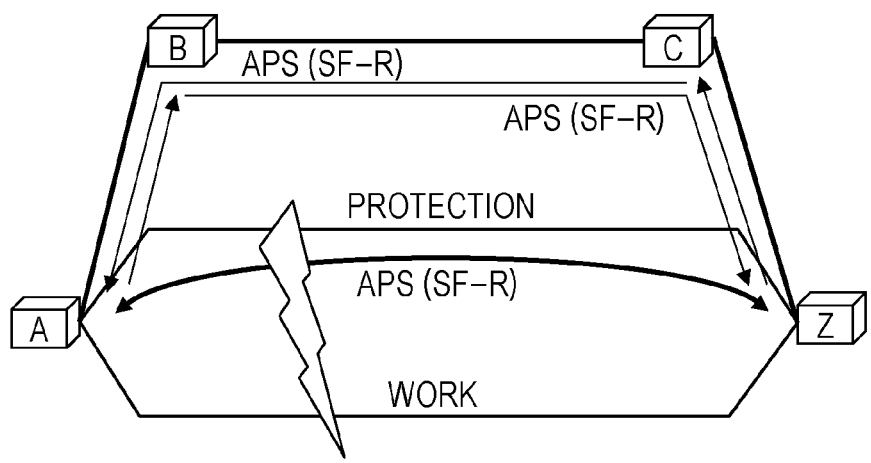
FIG. 29 illustrates a switchover operation in the second variation.

Next, an operation performed when a failure occurs in both the W path and the P path will be described with reference to FIGS. 29 to 31. FIG. 29 is equivalent to FIG. 9 to which OTN is applied, and FIG. 31 is equivalent to FIG. 12 to which OTN is applied. FIGS. 29 and 31 each illustrate an example of an operation performed when a failure is detected in the W path by the node Z and another failure is then detected in the P path by the node A. Processing in S41 to S45 in FIG. 31 is the same as the processing described above with reference to FIG. 12. Although not described in detail in this variation, operations equivalent to path switching illustrated in FIGS. 13 to 19 are possible in OTN as well.

Figure 30:
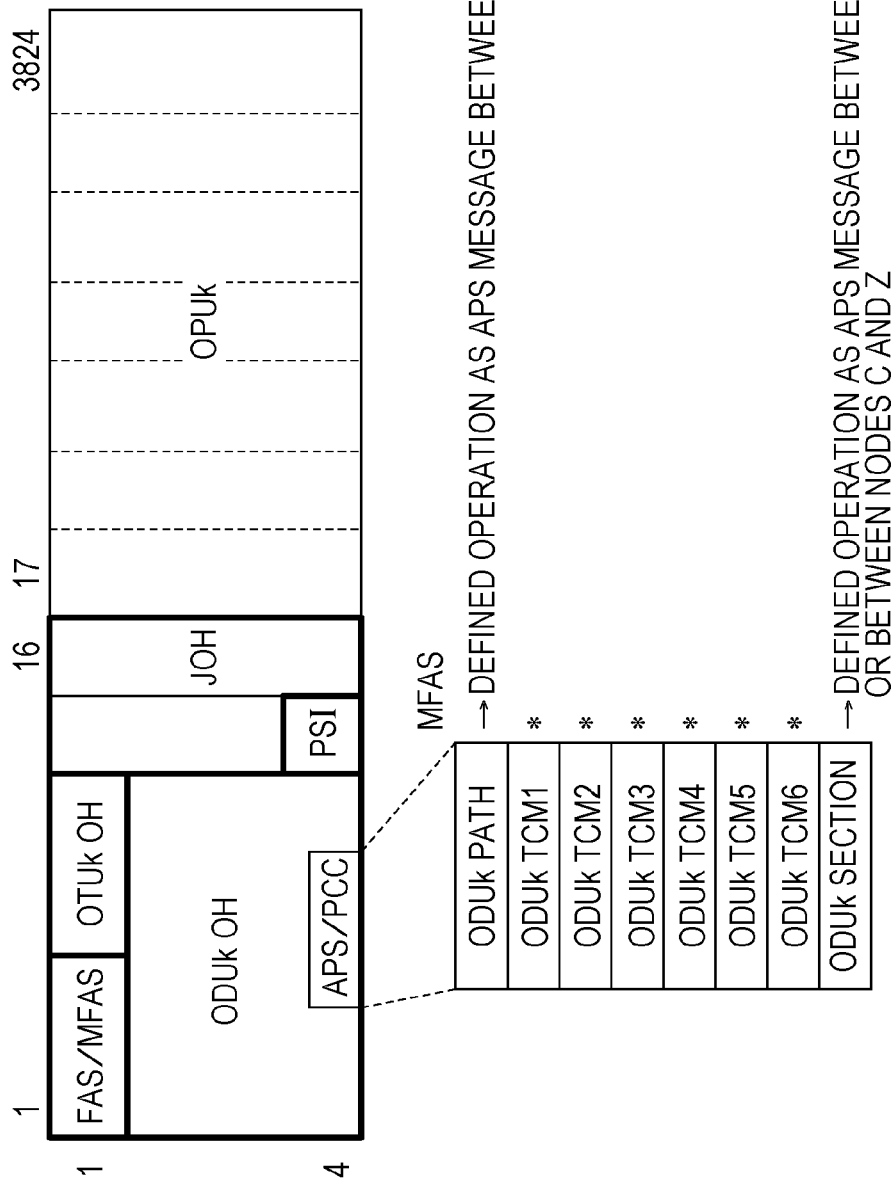
FIG. 30 also illustrates the switchover operation in the second variation.
Figure 31:
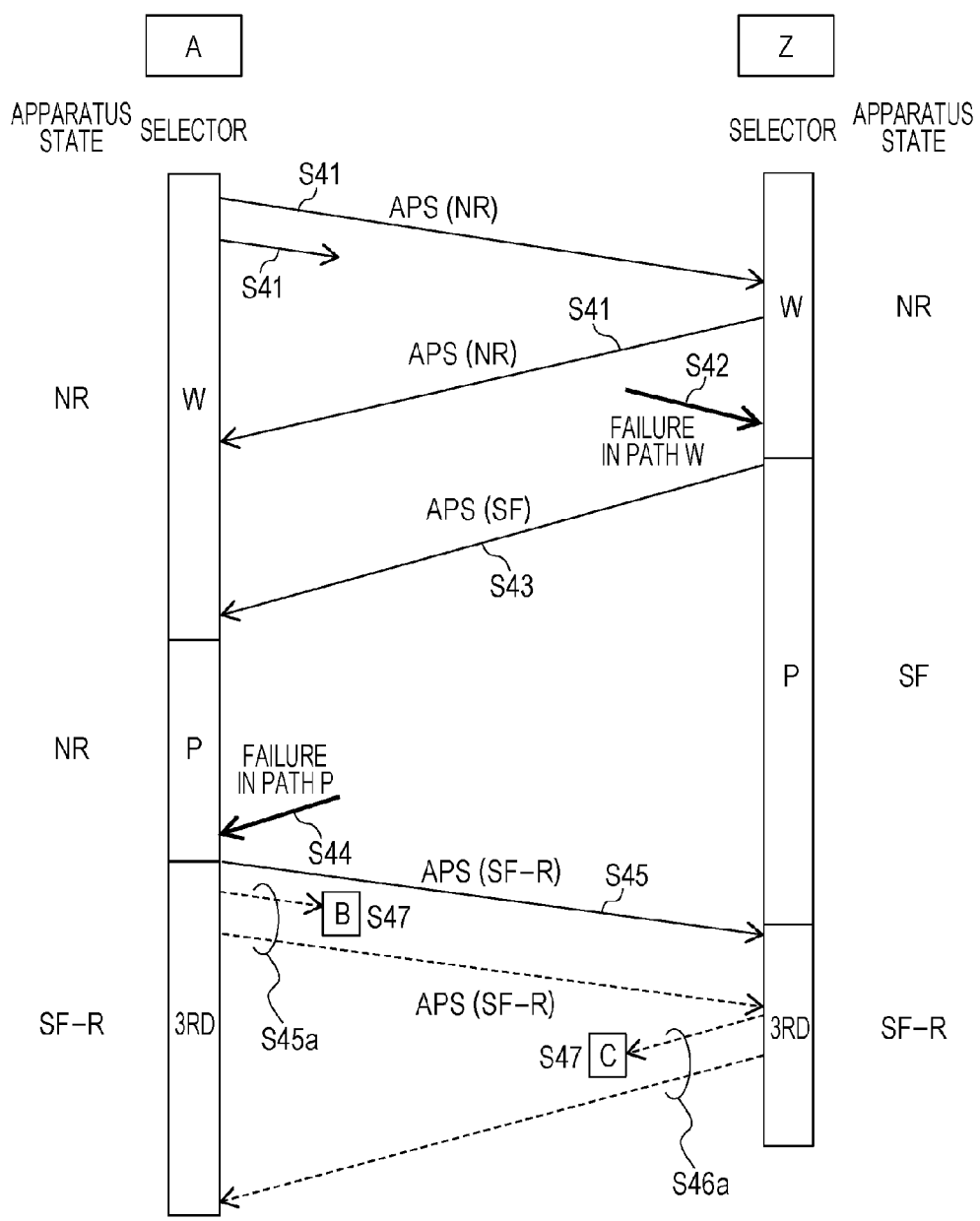
FIG. 31 is a sequence diagram illustrating the example of the switchover operation in the second variation.

In FIG. 31, at the node A (or node Z), the APS inserting units 251A and 261A illustrated in, for example, FIG. 20 insert an APS (SF-R) message into both the ODUk section (or TCM6) and the ODUk path as illustrated in FIG. 30 (S45a and S46a).

The node B (or node C) analyzes the ODUk section (or TCM6) and determines that the APS priority is SF-R (S47).

Thus, the node B (or node C) can forward the OPUk signal, which is a main signal, that is, a payload portion, to the node A, node B, and node C in that order and to the node Z, node C, and node B in that order. If forwarding is not possible, the signal may be overwritten with extra traffic instead of being forwarded.

If at least one of the W path and P path is then recovered, APS (SF-R) message transmission by using the ODUk path is stopped in the third path and a switchover is made to an operation in which the ODUk section or TCM6 is used. APS (SF-R) message transmission through the ODUk path may be permitted at least once before it is stopped.

If the node B (or node C) receives an APS message with an APS priority other than SF-R, the node stops the OPUk signal, which is a main signal, that is, a payload portion, from being forwarded to the node A, node B, and node C in that order and from being forwarded the node Z, node C, and node B in that order.

The structure (functional blocks) of the nodes A and Z may be the same as the structure illustrated in FIGS. 20 and 21, and the structure (functional blocks) of the nodes B and C may be the same as the structure illustrated in FIG. 23. At the node B or (node C), the APS extracting unit 3212 illustrated in FIG. 23 preferably controls forwarding processing according to the analysis result of the ODUk section or TCM6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system comprising:
   a work path and a protection path that are set between a first transfer apparatus including a first processor, and a second transfer apparatus including a second processor, one of the work path and the protection path being selected by the first transfer apparatus and the second transfer apparatus according to a control signal that includes first information indicating whether there is a failure in one of the work path and the protection path; and
   one or more third transfer apparatuses through which a third path passes, each of the one or more third transfer apparatuses including a third processor, wherein
   when a failure occurs in both the work path and the protection path, the first processor of the first transfer apparatus or the second processor of the second transfer apparatus transmits the control signal in which the first information has been changed to second information to the protection path and the one or more third transfer apparatuses, the second information including a specific signal indicating that a failure had occurred in both the work path and the protection path,
   the third processors of the one or more third transfer apparatuses, upon reception of the control signal that includes the second information, activate the third path,
   either the first processor of the first transfer apparatus or the second processor of the second transfer apparatus that has not transmitted the control signal, upon reception of the control signal that includes the second information, selects the third path,
   when at least one of the work path and the protection path is recovered from the failure, the first processor of the first transfer apparatus or the second processor of the second transfer apparatus transmits a second control signal in which the second information has been changed to the first information to the protection path and the one or more third transfer apparatuses,
   upon reception of the second control signal that includes the first information, the third processors of the one or more third transfer apparatuses disable the third path, and
   when either the first processor of the first transfer apparatus or the second processor of the second transfer apparatus that has not transmitted the second control signal receives the second control signal through the protection path or the third path, either the first processor of the first transfer apparatus or the second processor of the second transfer apparatus that receives the second control signal selects one of the work path and the protection path.

2. The communication system according to claim 1, wherein the control signal is an automatic protection switching (APS) message, the APS message being transmitted by using a link layer protocol frame, a generalized multi-protocol label switching (GMPLS) packet, or an optical data unit (ODU) frame.

3. A transfer apparatus comprising:
   a memory; and
   a processor coupled to the memory, the processor being configured to:
   select one of a work path and a protection path provided for the work path according to a control signal that includes first information indicating whether there is a failure in one of the work path and the protection path, the control signal being transmitted to and received from another transfer apparatus through the protection path;
   when a failure occurs in both the work path and the protection path, transmit, to the protection path and a third path coupled to the another transfer apparatus, a control signal in which the first information has been changed to second information, the second information including a specific signal indicating that a failure had occurred in both the work path and the protection path, the third path being activated upon reception of the control signal that includes the second information is received;
   select the third path upon transmission of the control signal that includes the second information or upon reception of the control signal that includes the second information from the another transfer apparatus through the protection path or the third path;
   upon receiving the control signal that includes the first information, after the third path has been activated, disable the third path;
   when at least one of the work path and the protection path is recovered from the failure, change the second information included in the control signal to be transmitted to the protection path and the third path, to the first information; and
   upon transmission of the control signal that includes the first information or upon reception of the control signal that includes the first information from the another transfer apparatus through the protection path or the third path, select one of the work path and the protection path.

\* \* \* \* \*